(12) United States Patent
Tsukada et al.

(10) Patent No.: US 12,231,604 B2
(45) Date of Patent: *Feb. 18, 2025

(54) IMAGE PROCESSING APPARATUS FOR DETERMINING A GROUP TO SHARE IMAGE DATA IN BY SELECTING A REGISTERED OBJECT

(71) Applicant: CANON KABUSHIKI KAISHA, Tokyo (JP)

(72) Inventors: Yoshihiro Tsukada, Ibaraki (JP); Takuya Ushinohama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/479,735

(22) Filed: Oct. 2, 2023

(65) Prior Publication Data

US 2024/0031496 A1    Jan. 25, 2024

Related U.S. Application Data

(63) Continuation of application No. 17/859,939, filed on Jul. 7, 2022, now Pat. No. 11,811,982, which is a
(Continued)

(30) Foreign Application Priority Data

Jun. 29, 2020  (JP) ................................ 2020-111847
Jan. 22, 2021  (JP) ................................ 2021-009129

(51) Int. Cl.
*H04N 1/00*     (2006.01)
*H04N 1/32*     (2006.01)

(52) U.S. Cl.
CPC ..... *H04N 1/00217* (2013.01); *H04N 1/00233* (2013.01); *H04N 1/00244* (2013.01);
(Continued)

(58) Field of Classification Search
CPC ........... H04N 1/00217; H04N 1/00233; H04N 1/00244; H04N 1/00411; H04N 1/32085;
(Continued)

(56) References Cited

U.S. PATENT DOCUMENTS

| 2014/0063562 | A1* | 3/2014 | Lee ..................... | H04N 1/0023 358/439 |
| 2016/0050326 | A1* | 2/2016 | Lee ..................... | H04N 1/00244 358/402 |

(Continued)

*Primary Examiner* — Nicholas Pachol
(74) *Attorney, Agent, or Firm* — Canon U.S.A., Inc. IP Division

(57) ABSTRACT

An image processing apparatus communicates with a chat server configured to control sharing of received image data in a transmission destination group based on received information about the group. The image processing apparatus includes a registration unit configured to register a group of the chat server in association with an object, the group serving as a transmission destination of image data, an obtaining unit configured to obtain identification information corresponding to the group from the chat server, a display unit configured to display the registered object, and a transmission unit configured to transmit, if the displayed object is selected, the image data and the information about the group serving as the transmission destination to the chat server. The display unit displays the identification information with the object.

36 Claims, 20 Drawing Sheets

Related U.S. Application Data continuation of application No. 17/344,673, filed on Jun. 10, 2021, now Pat. No. 11,412,094.

(52) U.S. Cl.
CPC ..... *H04N 1/00411* (2013.01); *H04N 1/32085* (2013.01); *H04N 1/32106* (2013.01); *H04N 2201/3205* (2013.01); *H04N 2201/3252* (2013.01)

(58) Field of Classification Search
CPC ....... H04N 1/32106; H04N 2201/3205; H04N 2201/3252
See application file for complete search history.

(56) References Cited

U.S. PATENT DOCUMENTS

| | | | |
|---|---|---|---|
| 2021/0144266 A1* | 5/2021 | Tsukada | H04N 1/00464 |
| 2021/0160393 A1* | 5/2021 | Sugita | H04N 1/00217 |

* cited by examiner

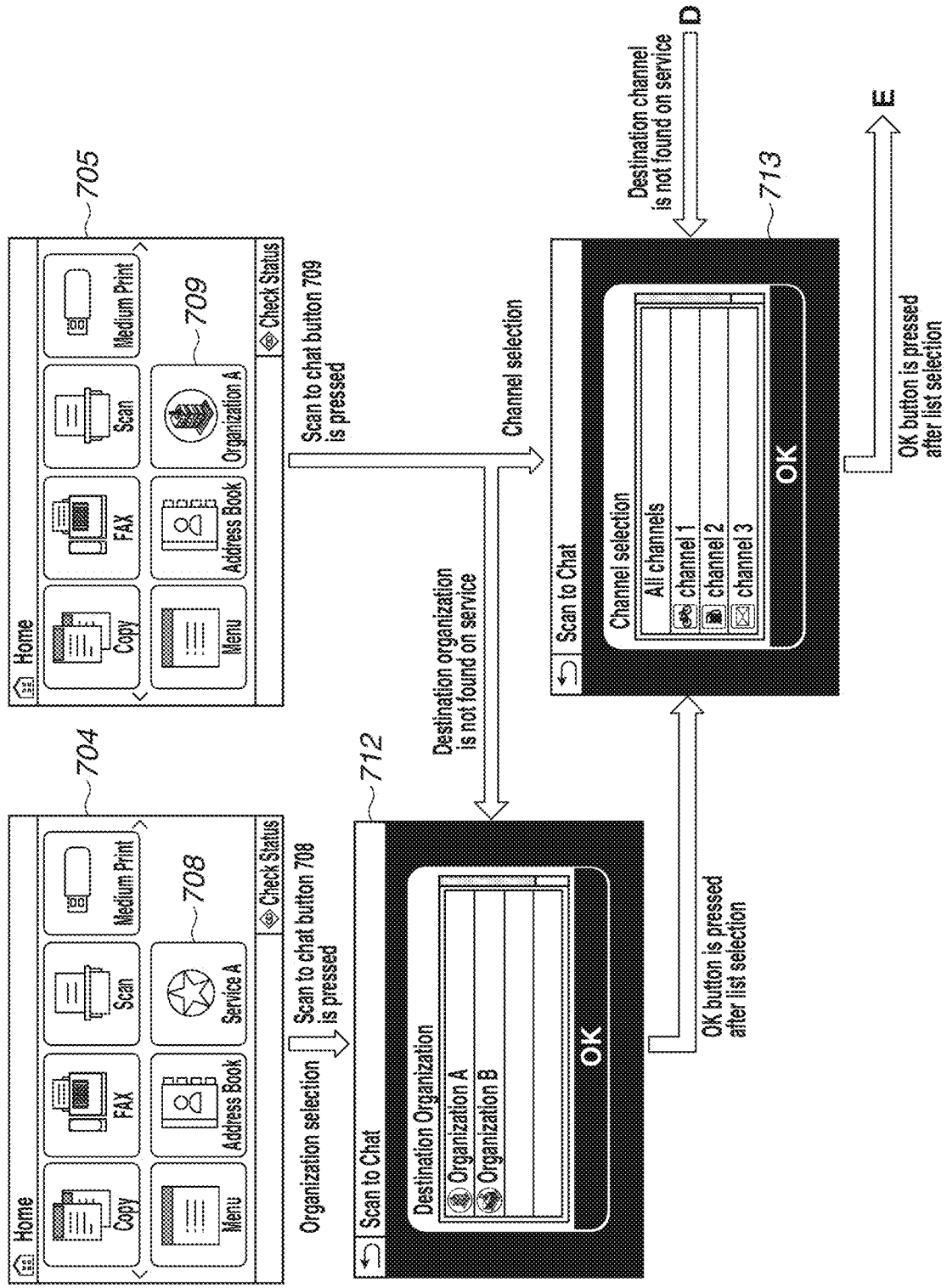

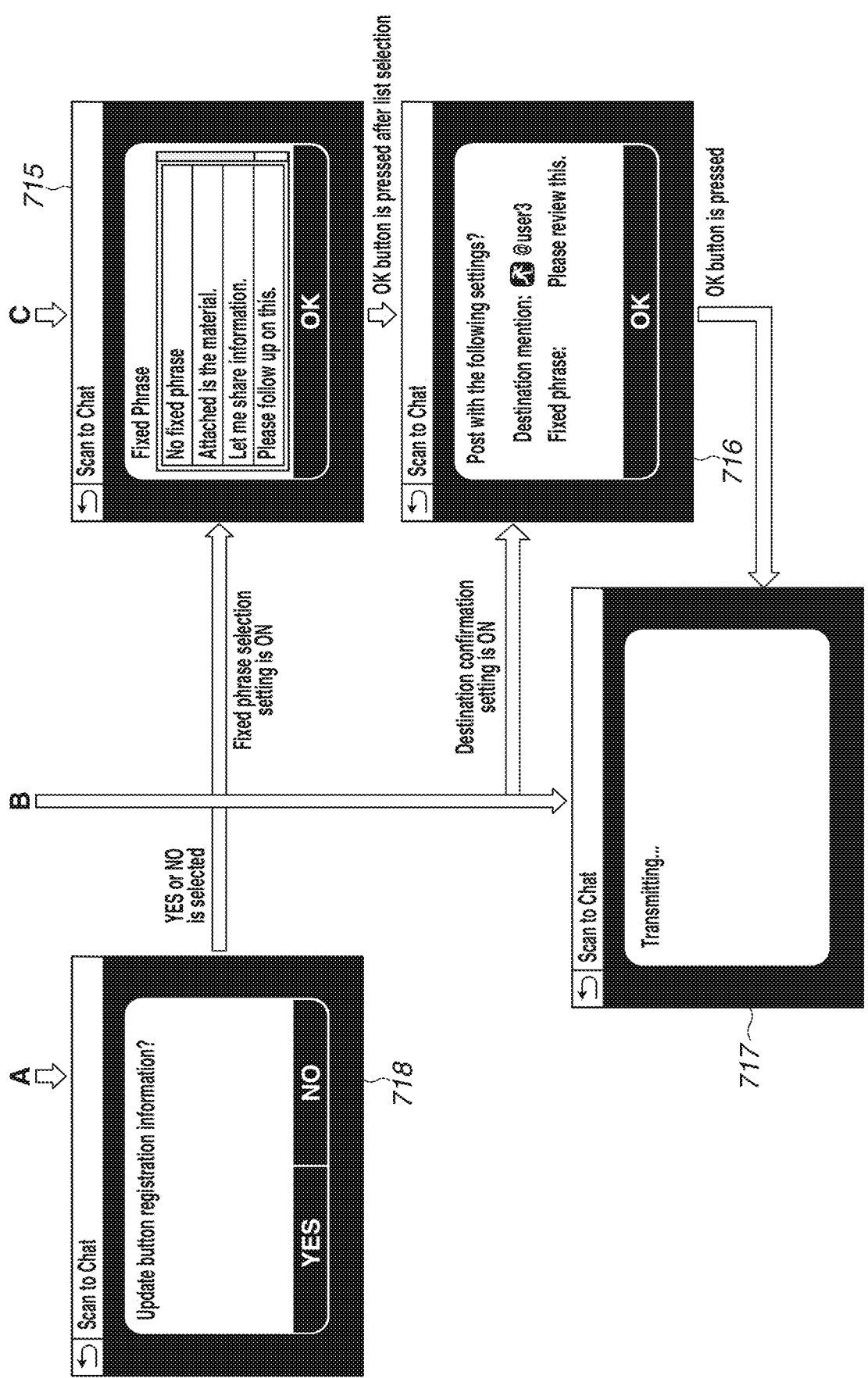

FIG.16

| Device ID/User ID | Authorization Information (Token Information) |
|---|---|
| user1 | xxToken1 |
| user2 | xxToken2 |
| user3 | xxToken3 |
| device1 | xxToken4 |
| device2 | xxToken5 |

FIG.18

| Category | Name | Icon Image | Image Source |
|---|---|---|---|
| service | Service A |  | Service A |
| service | Service B |  | WITHIN DEVICE |
| workspace | Organization A |  | Service A |
| workspace | Organization B |  | Service A |
| channel | channel 1 |  | Organization A on Service A |
| channel | channel 2 |  | Organization A on Service A |
| channel | channel 3 |  | Organization A on Service A |
| group | group 1 |  | Organization A on Service A |
| group | group 2 |  | Organization A on Service A |
| group | group 3 |  | Organization A on Service A |
| user | user1 |  | Organization A on Service A |
| user | user2 |  | Organization A on Service A |
| user | user3 |  | Organization A on Service A |

IMAGE PROCESSING APPARATUS FOR DETERMINING A GROUP TO SHARE IMAGE DATA IN BY SELECTING A REGISTERED OBJECT

CROSS REFERENCE TO RELATED APPLICATIONS

The present application is a continuation of U.S. patent application Ser. No. 17/859,939, filed on Jul. 7, 2022, which is a continuation of U.S. patent application Ser. No. 17/344,673, filed on Jun. 10, 2021, now issued as U.S. Pat. No. 11,412,094 on Aug. 9, 2022, which claims priority from Japanese Patent Application No. 2020-111847, filed on Jun. 29, 2020 and Japanese Patent Application No. 2021-009129, filed on Jan. 22, 2021, each of which are hereby incorporated by reference herein in their entirety.

BACKGROUND

Field of the Disclosure

The present disclosure relates to an image processing apparatus, a method of controlling the same, and a storage medium.

Description of the Related Art

Japanese Patent Application Laid-Open No. 2018-133000 discusses an image processing apparatus that displays titles and icons of obtained applications as objects to facilitate understanding of which of the objects to execute the applications is the object of which application.

The following issue can occur if a user uses a chat service published on the Internet to share image data generated by scanning in a specific talk room of the chat service. Suppose, for example, that information about a specific talk room (information about a group) to share image data in is stored in association with an object in advance, and image data is transmitted to the specific talk room by operating the object.

In such a case, if the titles and icons of applications are simply displayed as discussed in Japanese Patent Application Laid-Open No. 2018-133000, the user can determine what chat service the object represents but cannot easily determine which group the object is intended to share image data in.

In particular, a plurality of objects are sometimes registered for respective talk rooms to share image data in each of the plurality of talk rooms. In such a case, the user has difficulty in determining which object is intended for which talk room.

SUMMARY OF THE DISCLOSURE

The present disclosure is directed to providing a mechanism with which a group to share image data in by selecting a registered object can be easily determined from an object.

According to an aspect of the present disclosure, an image processing apparatus communicates with a chat server configured to control sharing of received image data in a transmission destination group based on received information about the group. The image processing apparatus includes a registration unit configured to register a group of the chat server in association with an object, the group serving as a transmission destination of image data, an obtaining unit configured to obtain identification information corresponding to the group from the chat server, a display unit configured to display the registered object, and a transmission unit configured to transmit, if the displayed object is selected, the image data and the information about the group serving as the transmission destination to the chat server. The display unit displays the identification information with the object.

Further features of the present disclosure will become apparent from the following description of exemplary embodiments with reference to the attached drawings.

BRIEF DESCRIPTION OF THE DRAWINGS

FIG. 14A and FIG. 14B illustrate an example of screen transitions in the scan to chat processing.

FIG. 15 illustrates an example of screen transitions in the scan to chat processing.

FIG. 16 illustrates an example of association between identifiers (IDs) and token information.

FIG. 18 illustrates elements of a message service and icons corresponding thereto.

DESCRIPTION OF THE EMBODIMENTS

Exemplary embodiments of the present disclosure will be described below with reference to the drawings. The configurations described in the following exemplary embodiments are merely examples, and the present disclosure is not limited to the illustrated configurations.

Figure 1:
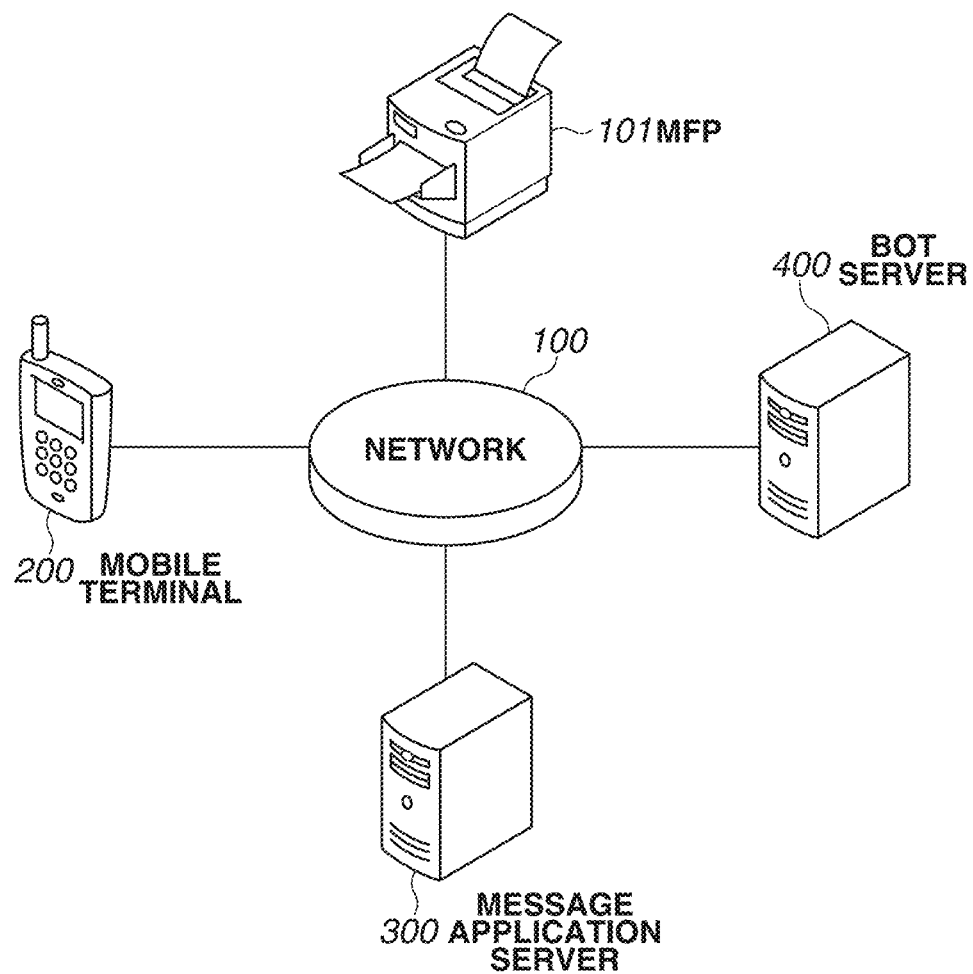
FIG. 1 illustrates an example of a system configuration according to an exemplary embodiment of the present disclosure.

FIG. 1 is a diagram illustrating an example of a system configuration according to a first exemplary embodiment of the present disclosure. The system configuration according to the first exemplary embodiment includes a multifunction peripheral (MFP) 101 and a message application server 300. The MFP 101 is an image processing apparatus that can communicate with a mobile terminal 200, which is an example of a terminal apparatus, via a network 100. A bot server 400 is also communicably connected via the network 100. The message application server 300 is a chat server that manages a chat service for receiving messages and image data transmitted from the MFP 101 and the mobile terminal 200 and displaying the messages and the image data on the mobile terminal 200 and/or a not-illustrated personal computer (PC) based on user operations. The bot server 400 links a bot application installed on the message application server 300 connected to the MFP 101 with corresponding information (token information), and transfers a request from the MFP 101 to the message application server 300. The network 100 according to the present exemplary embodiment may be the Internet or a local area network (LAN). The network 100 may be a wired or wireless network.

Figure 2:
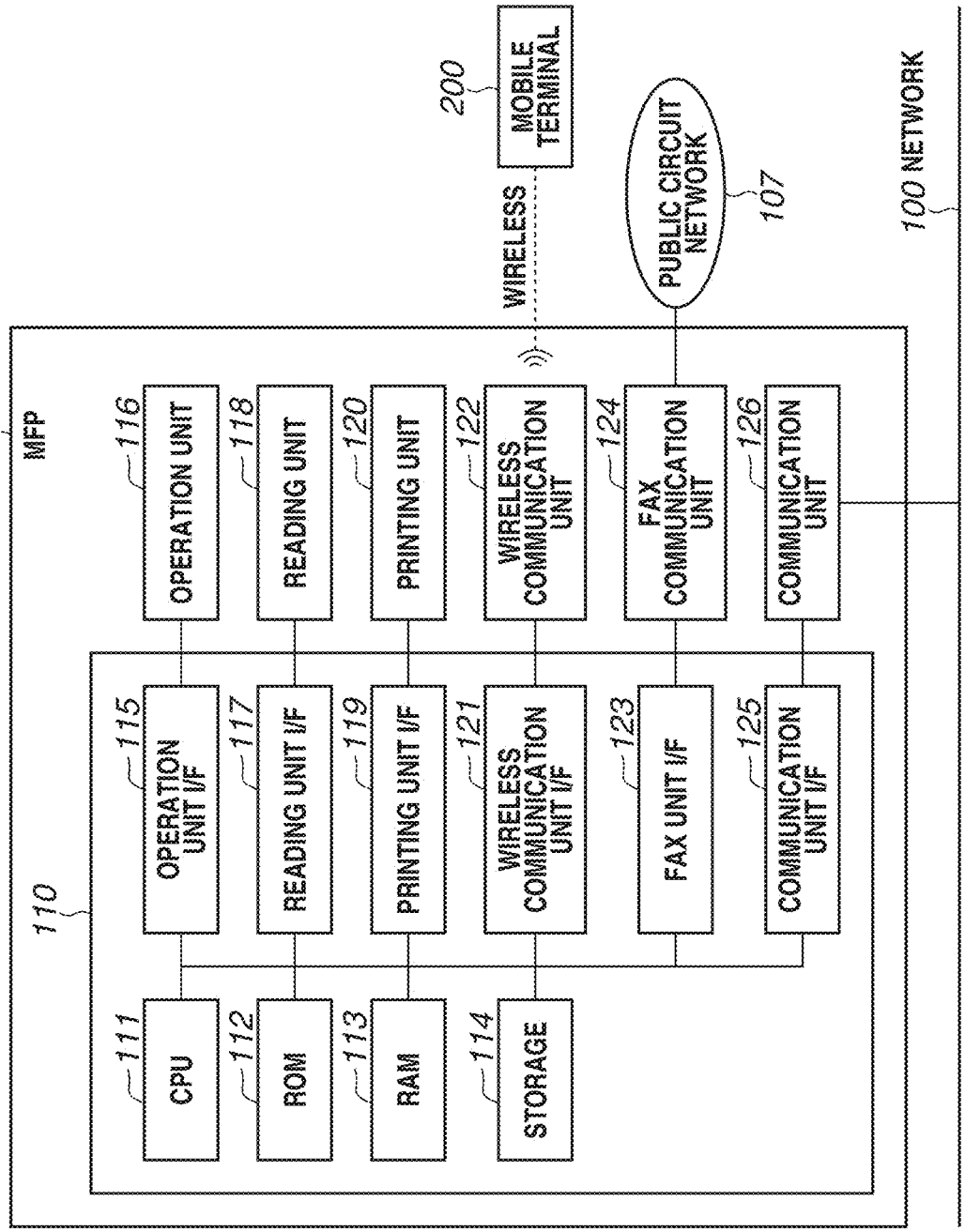
FIG. 2 illustrates an example of a hardware configuration of a multifunction peripheral (MFP).

FIG. 2 is a diagram illustrating an example of a hardware configuration of the MFP 101. The MFP 101 includes a central processing unit (CPU) 111, a read-only memory (ROM) 112, a random access memory (RAM) 113, a storage 114, an operation unit interface (UF) 115, an operation unit 116, a reading unit I/F 117, a reading unit 118, a printing unit I/F 119, a printing unit 120, a wireless communication unit I/F 121, and a wireless communication unit 122. The MFP 101 also includes a facsimile (FAX) unit I/F 123, a FAX communication unit 124, a communication unit I/F 125, and a communication unit 126.

A control unit 110 including the CPU 111 controls entire operation of the MFP 101. The CPU 111 reads a control program stored in the ROM 112 or the storage 114 into the RAM 113 and performs various controls, such as a read control and a print control. The ROM 112 stores the control program that can be executed by the CPU 111. The ROM 112 also stores, for example, a boot program and font data. The RAM 113 is a main storage memory, and is used as a temporary storage area for loading various control programs stored in the ROM 112 and the storage 114. The storage 114 stores image data, print data, various programs, and various types of setting information. In the present exemplary embodiment, a flash memory is assumed to be used as the storage 114. However, auxiliary storage devices, such as a solid state drive (SSD) and a hard disc drive (HDD), may be used. An embedded MultiMediaCard (eMMC) may also be used.

The MFP 101 according to the present exemplary embodiment performs processes illustrated in flowcharts described below by using one CPU 111 and one memory (RAM 113). However, this is not restrictive. For example, the processes illustrated in the flowcharts described below may be performed by cooperation of a plurality of CPUs, RAMs, ROMs, and storages. Some of the processes may be performed by using a hardware circuit, such as an application specific integrated circuit (ASIC) and a field-programmable gate array (FPGA).

The operation unit I/F 115 connects the operation unit 116 and the control unit 110. Examples of the operation unit 116 include a display unit, such as a touch panel, and hardware keys. The operation unit 116 displays information to a user and detects inputs from the user.

The reading unit I/F 117 connects the reading unit 118, such as a scanner, and the control unit 110. The reading unit 118 reads an image of a document, and the CPU 111 converts the image into image data, such as binary data. The image data generated based on the image read by the reading unit 118 is transmitted to an external apparatus or printed on a recording sheet.

The printing unit I/F 119 connects the printing unit 120, such as a printer, and the control unit 110. The CPU 111 transfers image data (print data) stored in the RAM 113 to the printing unit 120 via the printing unit I/F 119. The printing unit 120 prints an image based on the transferred image data on a recording sheet fed from a sheet feed cassette.

The wireless communication unit I/F 121 is an I/F for controlling the wireless communication unit 122. The wireless communication unit I/F 121 wirelessly connects the control unit 110 and an external wireless device (here, the mobile terminal 200).

The control unit 110 is connected to a public circuit network 107 by the FAX unit I/F 123 controlling the FAX communication unit 124, such as a FAX. The FAX unit I/F 123 is an I/F for controlling the FAX communication unit 124. The FAX unit I/F 123 can connect to the public circuit network and control a FAX communication protocol by controlling a FAX communication modem or network communication unit (NCU).

The communication unit I/F 125 connects the control unit 110 and the network 100. The communication unit I/F 125 enables the communication unit 126 to transmit image data and various types of internal information about the MFP 101 to an external apparatus on the network 100 and receive information on the network 100 and print data from an information processing apparatus on the network 100. Examples of the method for transmission and reception via the network 100 may include transmission and reception using electronic mails, and file transmission using other protocols (e.g., the File Transfer Protocol (FTP), Server Message Block (SMB), and Web Distributed Authoring and Versioning (WebDAV)). Image data and various types of setting data can also be transmitted and received over the network 100 through Hypertext Transfer Protocol (HTTP) communication-based accesses from the mobile terminal 200, the message application server 300, and the bot server 400.

Figure 3:
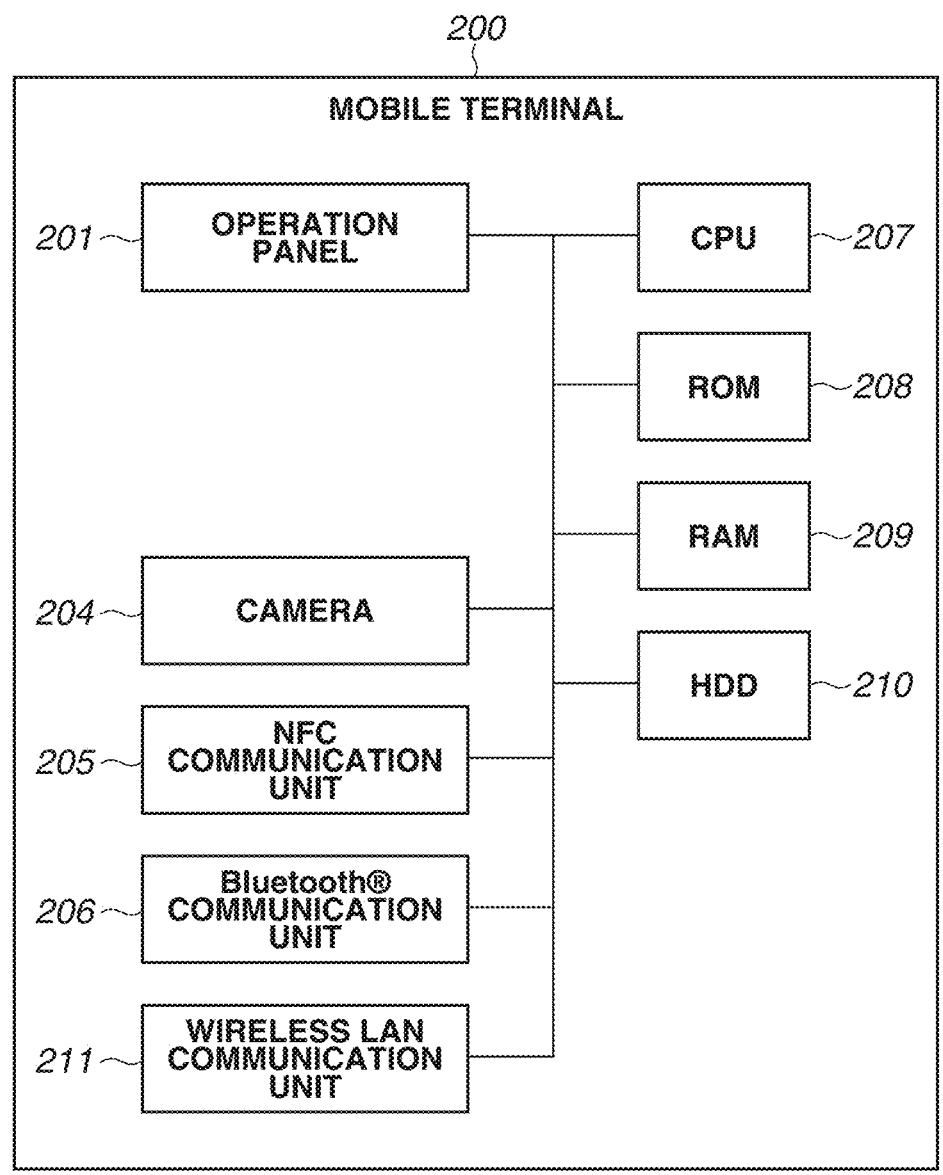
FIG. 3 illustrates an example of a hardware configuration of a mobile terminal.

FIG. 3 is a diagram illustrating an example of a hardware configuration of the mobile terminal 200. While a device, such as a smartphone and a tablet PC, is assumed to be used as the mobile terminal 200 according to the present exemplary embodiment, other information processing apparatuses capable of Wi-Fi communication may be used.

A CPU 207 reads a control program stored in a ROM 208 and performs various types of processing for controlling operation of the mobile terminal 200. The ROM 208 stores the control program. A RAM 209 is used as a temporary storage area, such as a main memory and a work area of the CPU 207. An HDD 210 stores various types of data including pictures and electronic documents.

An operation panel 201 has a touch panel function capable of detecting a user's touch operations, and displays various screens provided by an operating system (OS) and an electronic mail transmission application. The operation panel 201 is also used to check information stored in the message application server 300. The user can input desired operation instructions into the mobile terminal 200 by making touch operations on the operation panel 201. The mobile terminal 200 includes not-illustrated hardware keys, and the user can input operation instructions into the mobile terminal 200 by using the hardware keys.

The camera 204 captures an image based on the user's imaging instructions. Pictures captured by the camera 204 are stored in a predetermined area of the HDD 210. A program capable of analyzing a Quick Response (QR) code® can be used to obtain information from a QR code read by the camera 204.

The mobile terminal 200 can exchange data with various peripheral devices via a near field communication (NFC) communication unit 205, a Bluetooth® communication unit 206, and a wireless LAN communication unit 211. The Bluetooth® communication unit 206 of the mobile terminal 200 may support Bluetooth® Low Energy. Bluetooth® terminals are becoming prevalent.

Figure 4:
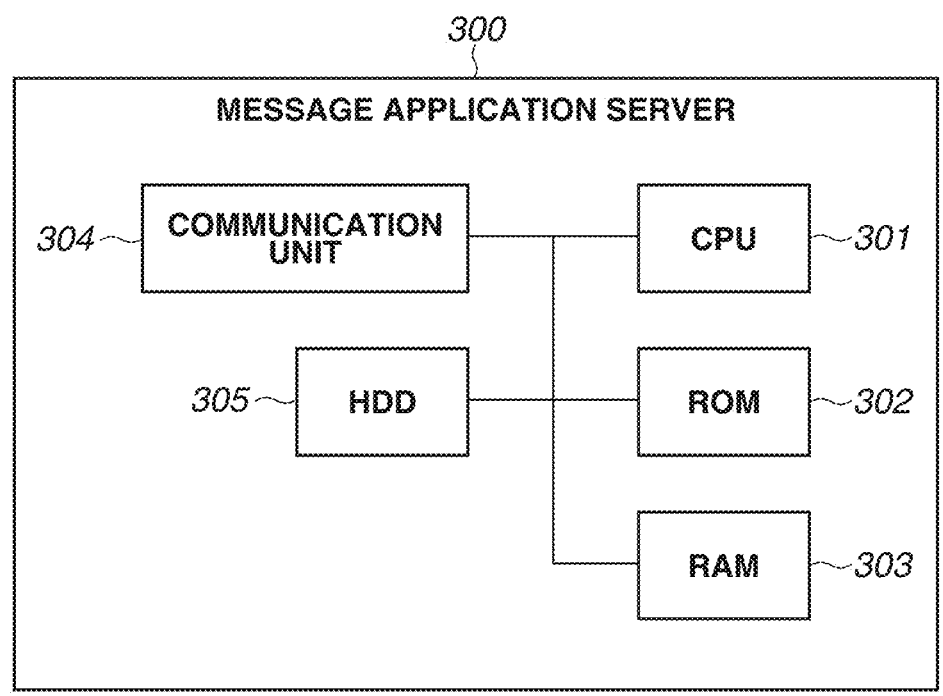
FIG. 4 illustrates an example of a hardware configuration of a message application server.

FIG. 4 is a diagram illustrating a hardware configuration of the message application server 300. A CPU 301 reads a control program stored in a ROM 302 and performs various types of processing for controlling operation of the message application server 300. The ROM 302 stores the control program. A RAM 303 is used as a main memory of the CPU 301 or a temporary storage area, such as a work area. An HDD 305 stores various types of data including messages, images, and channel information. The message application server 300 can exchange data with various devices, such as the mobile terminal 200 and the MFP 101, via a communication unit 304. The communication unit 304 may perform wired communication using Ethernet®, and may perform wireless communication, such as Wi-Fi communication.

Figure 5:
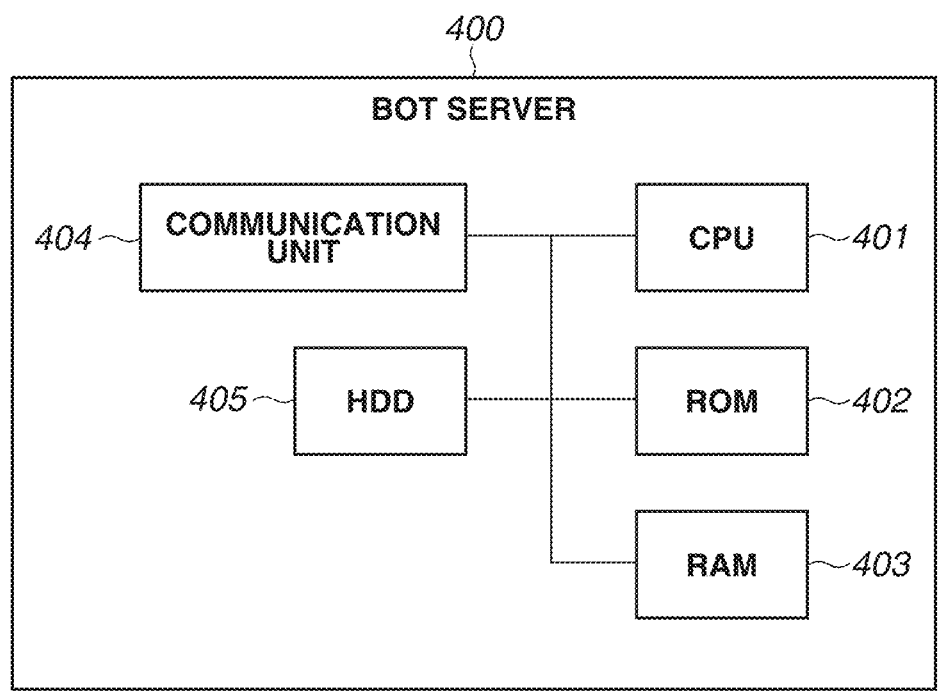
FIG. 5 illustrates an example of a hardware configuration of a bot server.

FIG. 5 is a diagram illustrating an example of a hardware configuration of the bot server 400. A CPU 401 reads a control program stored in a ROM 402 and performs various types of processing for controlling operation of the bot server 400. The ROM 402 stores the control program. A RAM 403 is used as a main memory of the CPU 401 or a temporary storage area, such as a work area. An HDD 405 stores various types of data including messages, image data, and channel information. The bot server 400 can transmit and receive data to/from various devices, such as the mobile terminal 200, the MFP 101, and the message application server 300, via a communication unit 404.

Figure 13:
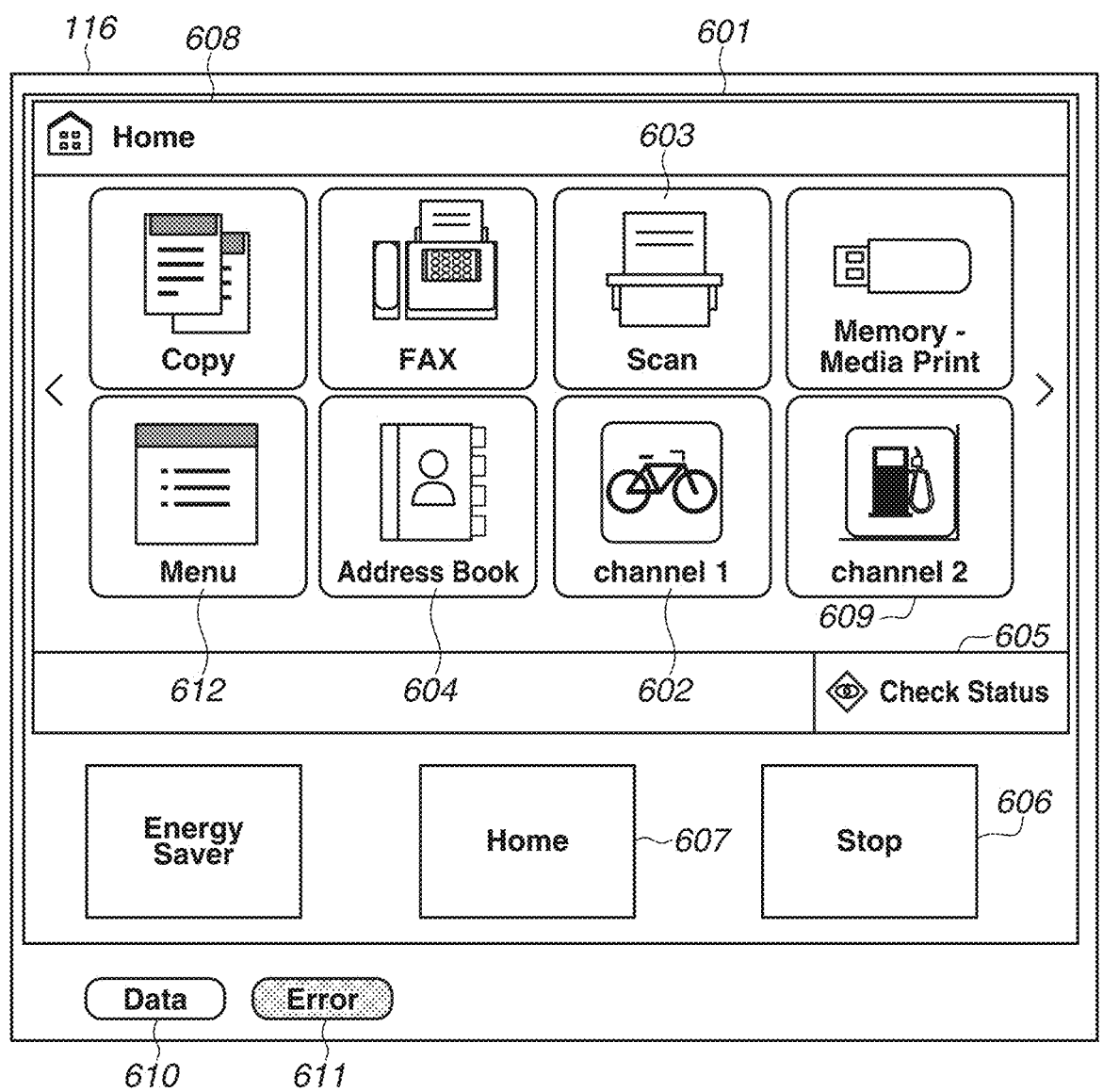
FIG. 13 illustrates an example of a home screen displayed on an operation unit of the MFP.

FIG. 13 is a diagram illustrating an example of a home screen displayed on the operation unit 116 of the MFP 101. The operation unit 116 includes a touch panel 601 for displaying an operation screen, and light-emitting diodes (LEDs) 610 and 611. The touch panel 601 is an instruction unit. The touch panel 601 also functions as an acceptance unit for accepting instructions from the user and a display unit for displaying a screen. The user directly touches the screen displayed on the touch panel 601 with a finger or an object, such as a stylus, and gives instructions to perform various functions based on the displayed screen.

The touch panel 601 illustrated in FIG. 13 is displaying a home screen 608. The home screen 608 is the initial screen for giving instructions to perform the functions of the MFP 101. The home screen 608 is a screen intended to select screen displays for making various settings of the functions for the MFP 101 to perform, such as a copy, FAX, scan, and media print functions.

A status check button 605 is an object for displaying a screen for checking the status of the MFP 101 (status check screen). A transmission history and a job execution history can be displayed on the not-illustrated status check screen.

A scan to chat button 602 is an object for performing scan to chat processing. When the scan to chat button 602 is selected by the user, a predetermined screen illustrated in FIGS. 14 and 15 is displayed on the operation unit 116 based on setting information about the scan to chat button 602. The scan to chat processing will be described in detail with reference to FIGS. 6 and 7. The scan to chat button 602 can be registered on a button setting registration screen 1701 illustrated in FIG. 17.

Figure 17:
FIG. 17 illustrates an example of a button setting registration screen.

The user can register another scan to chat button 609 on the button setting registration screen 1701 illustrated in FIG. 17.

A scan button 603 is an object for displaying a scan selection screen (not illustrated). The scan selection screen is a screen for selecting transmission functions, such as electronic mail (email) transmission, file transmission using SMB, FTP, or HTTP, and Internet FAX (I-FAX) transmission. The setting screens of the respective transmission functions are displayed by touching displayed objects representing the transmission functions.

An address book button 604 functions as an object for displaying an address book screen of the MFP 101 when selected by the user. The LEDs 610 and 611 notify the user of the state of the MFP 101. The LED 610 is lit while receiving an email or a print job or while executing a print job. The LED 611 is lit upon occurrence of an error in the MFP 101. A stop button 606 is an object for cancelling various operations. The stop button 606 is an object constantly displayed on the operation unit 116. A home button 607 is an object for displaying the home screen 608. The home button 607 is an object constantly displayed on the operation unit 116. A menu button 612 is an object for displaying a screen for making environmental settings, such as the language to be used, and settings of the functions.

Figure 6:
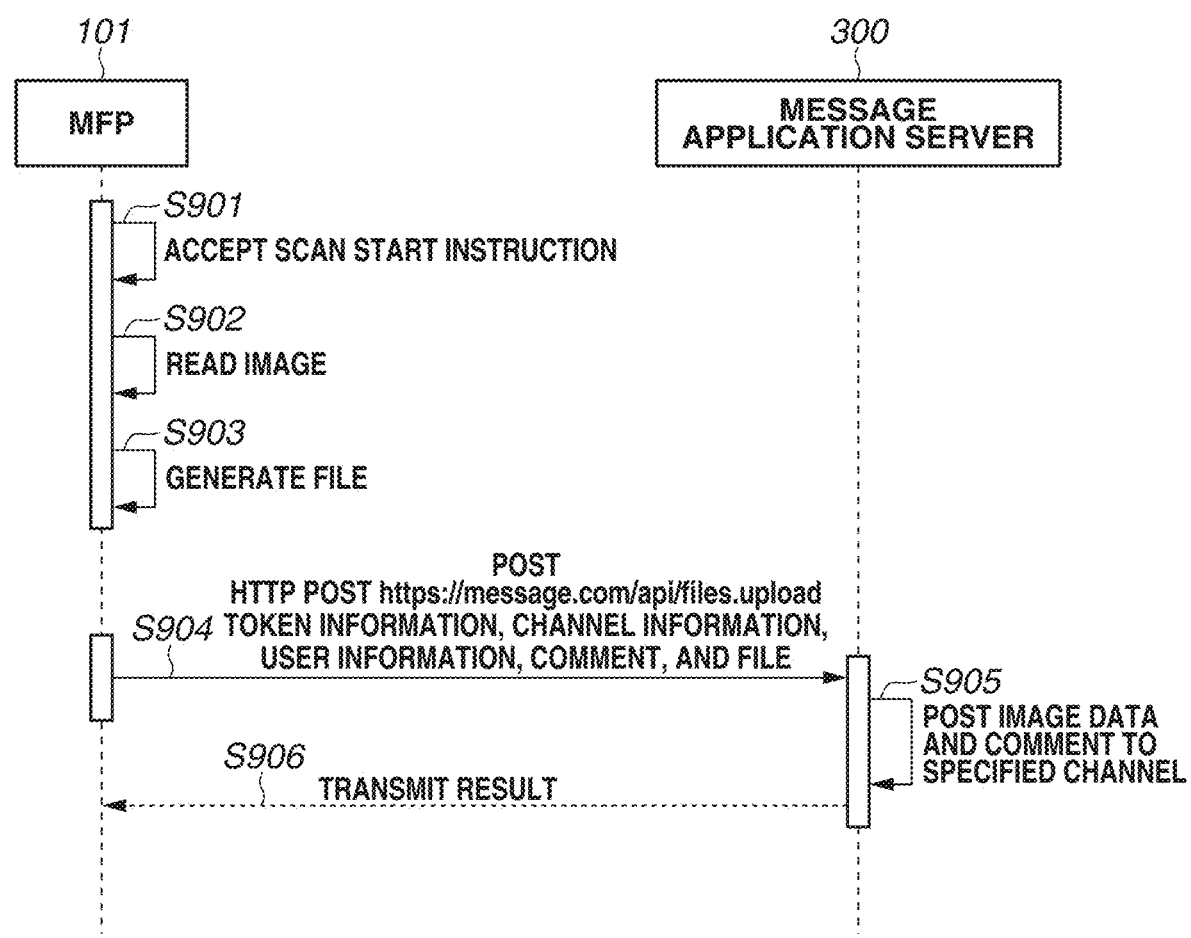
FIG. 6 illustrates an example of a sequence where the MFP transmits a file generated by scanning to the message application server.

FIG. 6 is a diagram illustrating an example of a sequence where the MFP 101 scans a document and transmits the generated file to the message application server 300. The sequence of FIG. 6 is started when the scan to chat button 602 according to the present exemplary embodiment is selected. The processing of the MFP 101 is implemented by the CPU 111 of the MFP 101 reading the program stored in the ROM 112 into the RAM 113 and executing the program. The processing of the message application server 300 is implemented by the CPU 301 of the message application server 300 reading the program stored in the ROM 302 into the RAM 303 and executing the program.

In step S901, the CPU 111 of the MFP 101 accepts the selection of the scan to chat button 602, which is a scan start instruction. If a screen for accepting the selection of a channel, a mention user, and/or a fixed phrase is displayed in response to the selection of the scan to chat button 602, the scan is started when the selection is accepted. Details will be described with reference to the screen flows (screen transitions) illustrated in FIGS. 14 and 15.

In step S902, the CPU 111 controls the reading unit 118 to read an image of a document based on scan settings made on the button setting registration screen 1701 illustrated in FIG. 17 described below. In step S903, the CPU 111 generates image data (file) based on the read image.

In step S904, the CPU 111 controls the communication unit 126 to perform transmission processing for posting the image data to the message application server 300 by HTTP communication. In this step, token information registered on the button setting registration screen 1701 illustrated in FIG. 17, channel information set on the button setting registration screen 1701 or a screen illustrated in FIGS. 14 and 15, user information about a user to be mentioned, and a comment are transmitted along with the image data. Such information is transmitted by executing a command "HTTP POST https://message.com/api/files.upload".

As employed herein, token information is information corresponding to a bot application installed on the message application server 300, and the token information can uniquely identify the bot application. The information corresponding to the bot application is information corresponding to a workspace registered in the message application server 300, and the information can uniquely identify the workspace. In other words, the token information is information corresponding to the workspace registered in the message application server 300, and the token information can uniquely identify the workspace.

As employed herein, a workspace refers to an organization, a group, or the like to which a plurality of users belongs in the message application. A channel is comparable with a chat room in the workspace. The chat room here refers to a mechanism for a plurality of users participating in the chat room to transmit and receive messages to/from each other and communicate as if having a conversation. While in the present exemplary embodiment a channel is described to be a chat room, a channel is not limited thereto and may be any mechanism for a plurality of users to transmit and receive messages and communicate as if having a conversation. Examples may include a group chat, a room, a talk room, and a group.

As employed herein, a bot application refers to an application for registering the MFP 101 as a user in the message application and posting messages and image data. Bot applications are installed on the message application server 300. If image data is transmitted to the message application server 300 with a bot application specified, the bot application posts the transmitted image data with the message application. The HDD 305 of the message application server 300 stores the bot applications and token information in association with each other. The bot applications are also associated with workspaces. The message application server 300 receives token information from the MFP 101, and can thereby return information about the workspace associated with the bot application associated with the token information. The token information, the bot application, and the workspace may be directly associated with each other. A workspace corresponding to token information registered in advance (workspace to which the user wants to transmit image data) can thus be selected from a large number of workspaces.

In step S905, the CPU 301 of the message application server 300 searches for registered workspace information and application information by using the token information received in step S904, and stores the specified channel in association with the received image data and channel information. In other words, the CPU 301 performs control to post the received image data and comment to the specified channel. If a mention user is specified, the CPU 301 further stores the received image data, the channel, and the post destination user (mention user) in association with each other. Whereby, a screen where the received image data is posted appears, if the user activates the message application on the mobile terminal 200 and specifies the channel to check the contents of the conversations in the channel.

In step S906, the CPU 301 of the message application server 300 transmits a result corresponding to whether the post is successful to the MFP 101 as HTTP communication response information. If the post is successful, the CPU 111 of the MFP 101 may display a notification that the post is successful on the operation unit 116. If the post is failed, the CPU 111 of the MFP 101 may display a notification that the post is failed on the operation unit 116. Alternatively, the CPU 111 may display the notification that the post is failed only when the post is failed, without displaying a notification when the post is successful.

Figure 7:
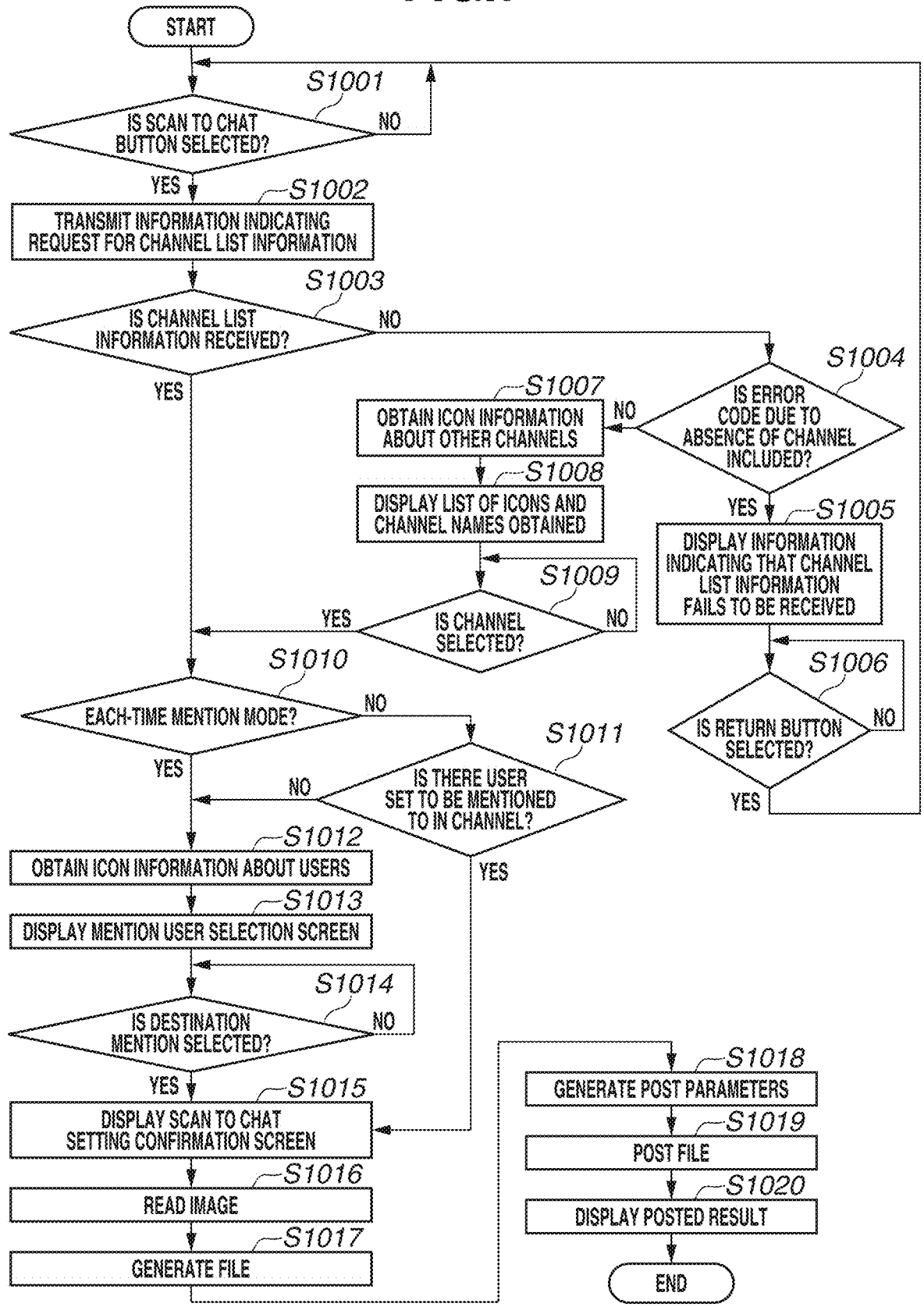
FIG. 7 illustrates an example of scan to chat processing performed by the MFP.

FIG. 7 is a flowchart illustrating an example of the scan to chat processing performed by the MFP 101. The processing of the flowchart of FIG. 7 is implemented by the CPU 111 reading the program stored in the ROM 112 into the RAM 113 and executing the program. The procedure illustrated in FIG. 7 is started by power-on of the MFP 101. The procedure of FIG. 7 is predicated on that a service, token information, and a channel have been set on the button setting registration screen 1701 illustrated in FIG. 17.

In step S1001, the CPU 111 determines whether the scan to chat button 602 is selected. If the scan to chat button 602 is determined to be selected (YES in step S1001), the processing proceeds to step S1002. If not (NO in step S1001), the processing returns to step S1001.

Figure 12:
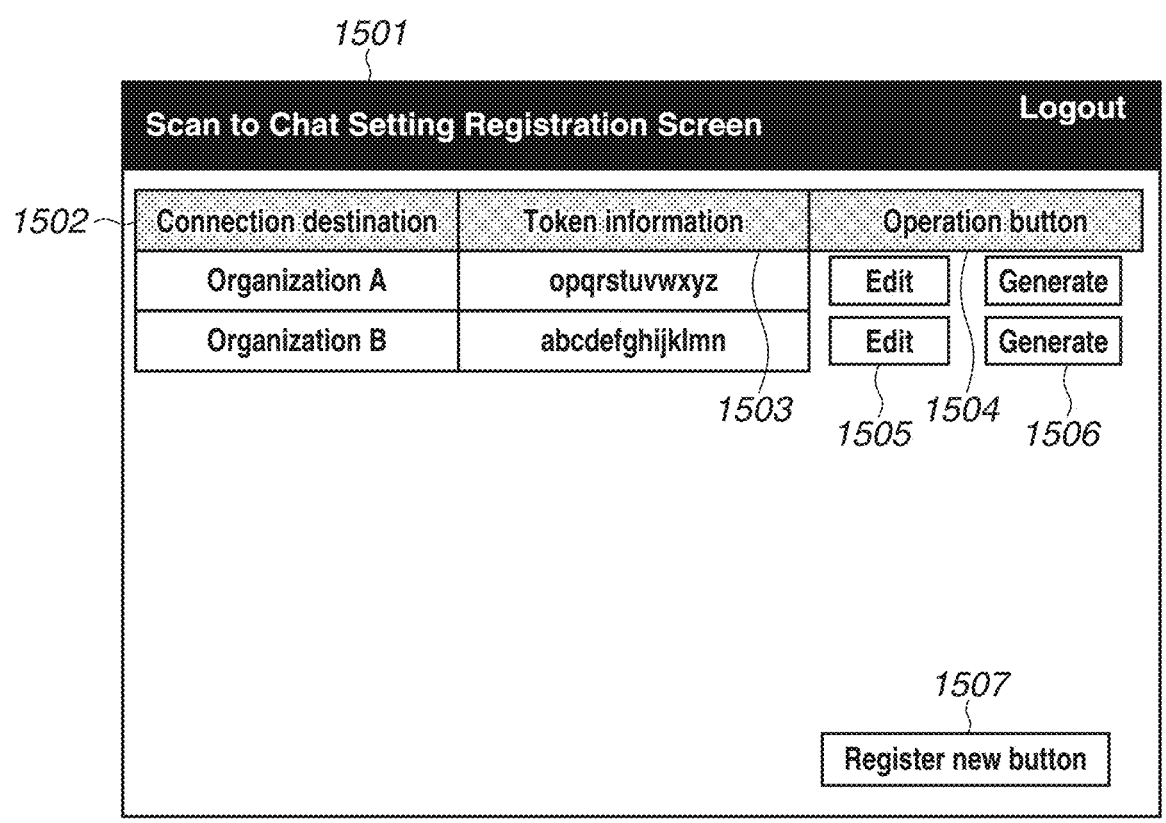
FIG. 12 illustrates an example of a setting registration screen.

In step S1002, the CPU 111 performs processing for transmitting information indicating a request for channel list information to the message application server 300 by HTTP communication, using token information 1503 (see FIG. 12) registered in advance.

In step S1003, the CPU 111 determines whether the channel list information is received from the message application server 300 in response to the acquisition request for the channel list information transmitted in step S1002. Specifically, the CPU 111 determines that the channel list information is not received, if the response of the HTTP communication includes a status code indicating an error or body information in the response includes a parameter indicating that the channel list information is unable to be obtained. If the channel list information is determined to be received (YES in step S1003), the processing proceeds to step S1010. If not (NO in step S1003), the processing proceeds to step S1004.

In step S1004, the CPU 111 identifies the error factor based on the result obtained in step S1003. If an error code due to the absence of the channel in the message application server 300 is determined to be included (YES in step S1004), the processing proceeds to step S1005. If not (NO in step S1004), the processing proceeds to step S1007.

In step S1005, the CPU 111 displays information indicating that the channel list information fails to be received on the operation unit 116.

In step S1006, the CPU 111 determines whether a return button is selected. If the return button is determined to be selected (YES in step S1006), the processing returns to step S1001. If not (NO in step S1006), the processing returns to step S1006.

In step S1007, the CPU 111 requests icon information about other channels in the target workspace from the message application server 300, and obtains the icon information.

In step S1008, the CPU 111 displays a list of icons and channel names obtained on a channel selection screen 713 (see FIG. 14A) on the operation unit 116.

In step S1009, the CPU 111 determines whether a channel is selected. If a channel is determined to be selected (YES in step S1009), the processing proceeds to step S1010. If not (NO in step S1009), the processing returns to step S1009.

In step S1010, the CPU 111 determines whether a scan to chat operation is in an each-time mention mode. If the scan to chat operation is in the each-time mention mode (YES in step S1010), the processing proceeds to step S1012. If not (NO in step S1010), the processing proceeds to step S1011.

In step S1011, the CPU 111 determines, from the received channel list information, whether there is a user set to be mentioned in a mention user selection field 1721 in the post destination channel. If there is determined to be a user to be mentioned in the channel (YES in step S1011), the processing proceeds to step S1015. If not (NO in step S1011), the processing proceeds to step S1012.

In step S1012, the CPU 111 obtains icon information about users belonging to the target channel from the message application server 300.

Figure 14B:
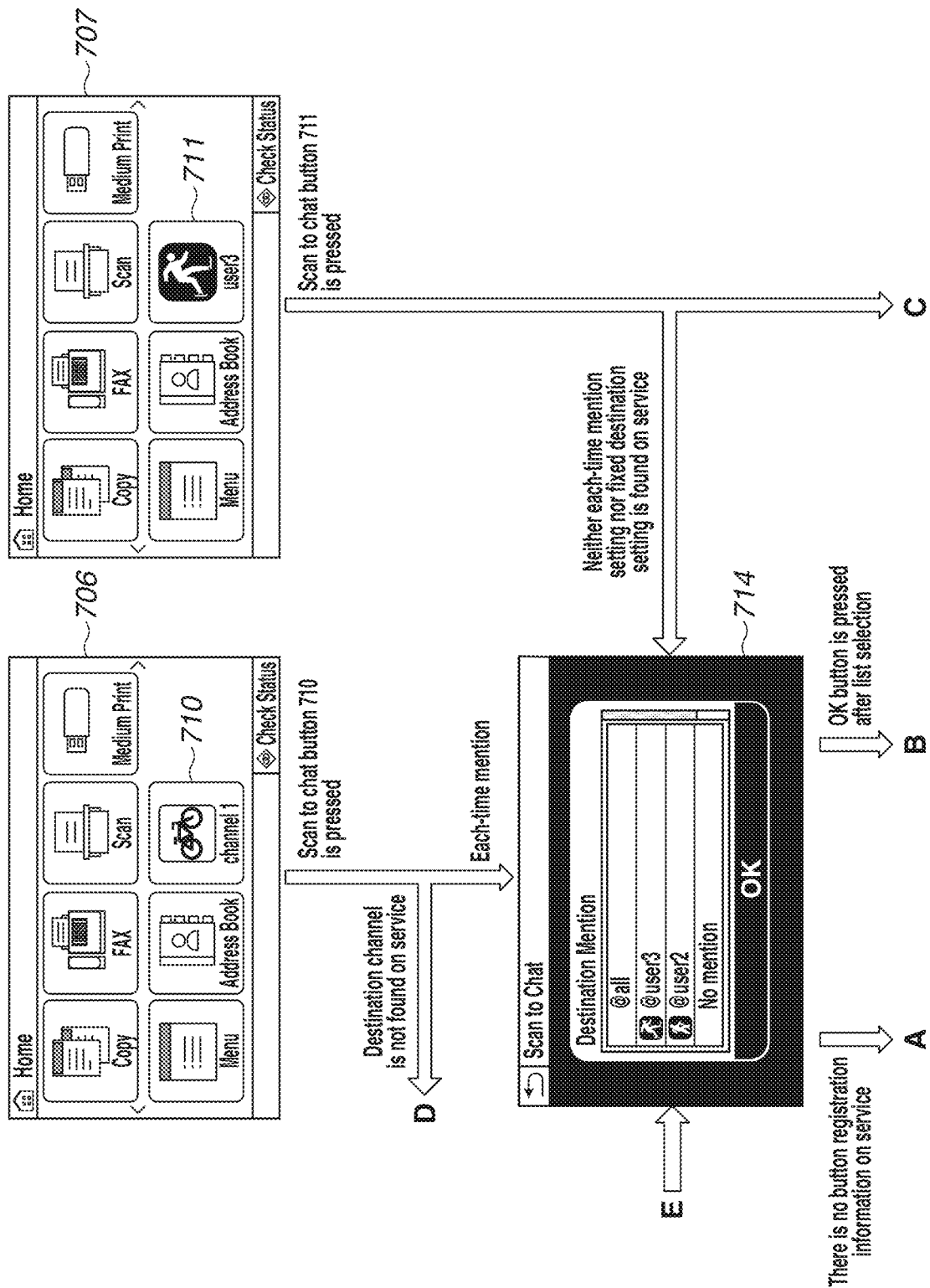

In step S1013, the CPU 111 displays a mention user selection screen 714 illustrated in FIG. 14B on the touch panel 601 of the operation unit 116. After a user to be mentioned is selected in step S1013, the CPU 111 may display a selection screen about whether to register the selected user as a user to be mentioned by fixed mention.

In step S1014, the CPU 111 determines whether destination mention is selected. If destination mention is determined to be selected (YES in step S1014), the processing proceeds to step S1015. If not (NO in step S1014), the processing returns to step S1014.

In step S1015, the CPU 111 displays a scan to chat setting confirmation screen 716 illustrated in FIG. 15 on the operation unit 116. If, in step S1015, the CPU 111 detects that the setting of the user to be mentioned and the setting for a comment selection screen to be made for the scan to chat processing are all finalized, the processing proceeds to step S1016.

In step S1016, the CPU 111 controls the reading unit 118 based on the scan settings, reads an image of a document, and generates image data. The scan settings specified by the user on the button setting registration screen 1701 of FIG. 17 are used as the scan settings.

In step S1017, the CPU 111 converts the image data generated in step S1016 into a file format set on a transmission setting screen.

In step S1018, the CPU 111 generates post parameters. The post parameters include the channel information about the post destination, a filename, mention information, and a posted comment. A file format corresponding to that set on the transmission setting screen is set as the file format. A filename specified on the transmission setting screen is specified as the filename.

In step S1019, the CPU 111 transmits the token information 1503 registered in advance, the file generated (converted) in step S1017, and the post parameters generated in step S1018 to the message application server 300 by the POST method of HTTP communication. The token information 1503 is token information input into a token information input field 1711 illustrated in FIG. 17.

With such data (the file into which the image data is converted and the post parameters) transmitted to the message application server 300, the message application server 300 performs the following processing. The processing includes executing control such that the received file is posted to the user specified by the received mention information in the channel specified by the received channel information.

In step S1020, the CPU 111 receives the posted result from the message application server 300 and displays the posted result on the touch panel 601 of the operation unit 116. In the present exemplary embodiment, the user can thus easily post the file from the MFP 101 to the channel of the message application server 300.

In the present exemplary embodiment, only one piece of token information is described to be registered. If a plurality of pieces of token information is registered, the token information-related processing, namely, the processing of steps S1002, S1003, and S1019 is performed as many times as the number of pieces of token information registered.

An example of a screen displayed on the operation panel 201 of the mobile terminal 200 when the file into which the image data is converted and the post parameters are transmitted to the message application server 300 in the processing of step S1019 will be described below with reference to FIG. 11.

FIGS. 14 and 15 are diagrams illustrating an example of screen transitions in the scan to chat processing. The screens illustrated in FIGS. 14 and 15 are displayed on the touch panel 601 of the operation unit 116. A scan to chat screen is displayed on the touch panel 601 of the operation unit 116 if the scan to chat button 602 displayed on the home screen 608 is selected.

The button icon to be displayed varies depending on the settings of the scan to chat button. If only application service information about the transmission destination is registered, a scan to chat button 708 is displayed on a home screen 704.

If the scan to chat button 708 is selected, an organization selection screen 712 is displayed on the touch panel 601 of the operation unit 116. The organization selection screen 712 is a screen for the user to select an organization to be included in the service registered in association with the scan to chat button 708.

If an organization is selected and the OK button is selected on the organization selection screen 712, the channel selection screen 713 for selecting a transmission destination (post destination) channel from the channels included in the selected organization is displayed.

If a transmission destination (post destination) channel is selected and the OK button is selected on the channel selection screen 713, the mention user selection screen 714 for selecting a mention user or users is displayed.

If a mention user or users is/are selected and the OK button is selected on the mention user selection screen 714, the fixed phrase selection screen 715, the destination confirmation screen 716, or an under-transmission screen 717 is displayed. If a fixed phrase selection setting has been set to on by the user, the fixed phrase selection screen 715 is displayed to accept the selection of text to be displayed with the image data. If a fixed phrase is selected and the OK button is selected on the fixed phrase selection screen 715, the destination confirmation screen 716 is displayed. The destination confirmation screen 716 displays the username of the mention user and the fixed phrase to be posted in the case of destination mention, whereby the user can confirm the contents to be posted. The destination confirmation screen 716 is also displayed if the fixed phrase selection setting has been set to off by the user, the destination confirmation setting has been set to on, and a mention user or users is/are selected and the OK button is pressed on the mention user selection screen 714.

If the OK button is selected on the destination confirmation screen 716, the document is scanned, the image data generated by the scan is transmitted, and the under-transmission screen 717 is displayed. The under-transmission screen 717 may be displayed during the document scan or after the document scan ends and the transmission of the image data is started. The document scan is also performed if the fixed phrase selection setting and the destination confirmation setting have been set to off by the user and a mention user or users is/are selected and the OK button is pressed on the mention user selection screen 714. The image data generated by the scan is then transmitted, and the under-transmission screen 717 is displayed. The timing to display the under-transmission screen 717 may be during the scan or when the transmission is in process after the end of the scan.

If settings up to the transmission destination organization are registered in association with the scan to chat button, a scan to chat button 709 is displayed on a home screen 705.

If the scan to chat button 709 is selected, the channel selection screen 713 is displayed. If the organization registered in association with the scan to chat button 709 is not found on the registered service, the organization selection screen 712 is displayed to accept the selection of an organization.

If settings up to the transmission destination channel are registered in association with the scan to chat button, a scan to chat button 710 is displayed on a home screen 706.

If the scan to chat button 710 is selected, the mention user selection screen 714 is displayed. If the channel registered in association with the scan to chat button 710 is not found on the registered service, the channel selection screen 713 is displayed to accept the selection of a channel.

If settings up to the mention user are registered in association with the scan to chat button, a scan to chat button 711 is displayed on a home screen 707.

If the scan to chat button 711 is selected, the fixed phrase selection screen 715 is displayed. If the mention user registered in association with the scan to chat button 711 is not found on the registered service or if the scan to chat button 711 is set to the each-time mention mode, the mention user selection screen 714 is displayed to accept the selection of a mention user or users.

The presence of the organization, the channel, and/or the mention user(s) registered in association with the scan to chat button on the service is determined by obtaining the latest information (such as channel list information) from the message application server 300 when the scan to chat button is selected, and determining whether the information registered in association with the scan to chat button is included in the obtained information. The foregoing processing is thereby implemented.

If any of the pieces of information registered in association with the scan to chat button is not found on the service, i.e., not included in the information obtained from the message application server 300, an update screen 718 is displayed. If the YES button is selected on the update screen 718, the information of which the user's selection is accepted due to its absence on the service is registered in association with the scan to chat button selected. If the NO button is selected, the information is not registered in association with the scan to chat button. If either the YES button or the NO button is selected, the fixed phrase selection screen 715 is displayed.

Alternatively, in the present exemplary embodiment, if the settings up to the transmission destination (post destination) channel are registered in association with the scan to chat button, the display of the mention user selection screen 714, the fixed phrase selection screen 715, and the destination confirmation screen 716 may be skipped even if no mention user is set. In other words, the MFP 101 may be configured to start scanning the document and transmit the generated image data if the scan to chat button is selected.

Figure 11:
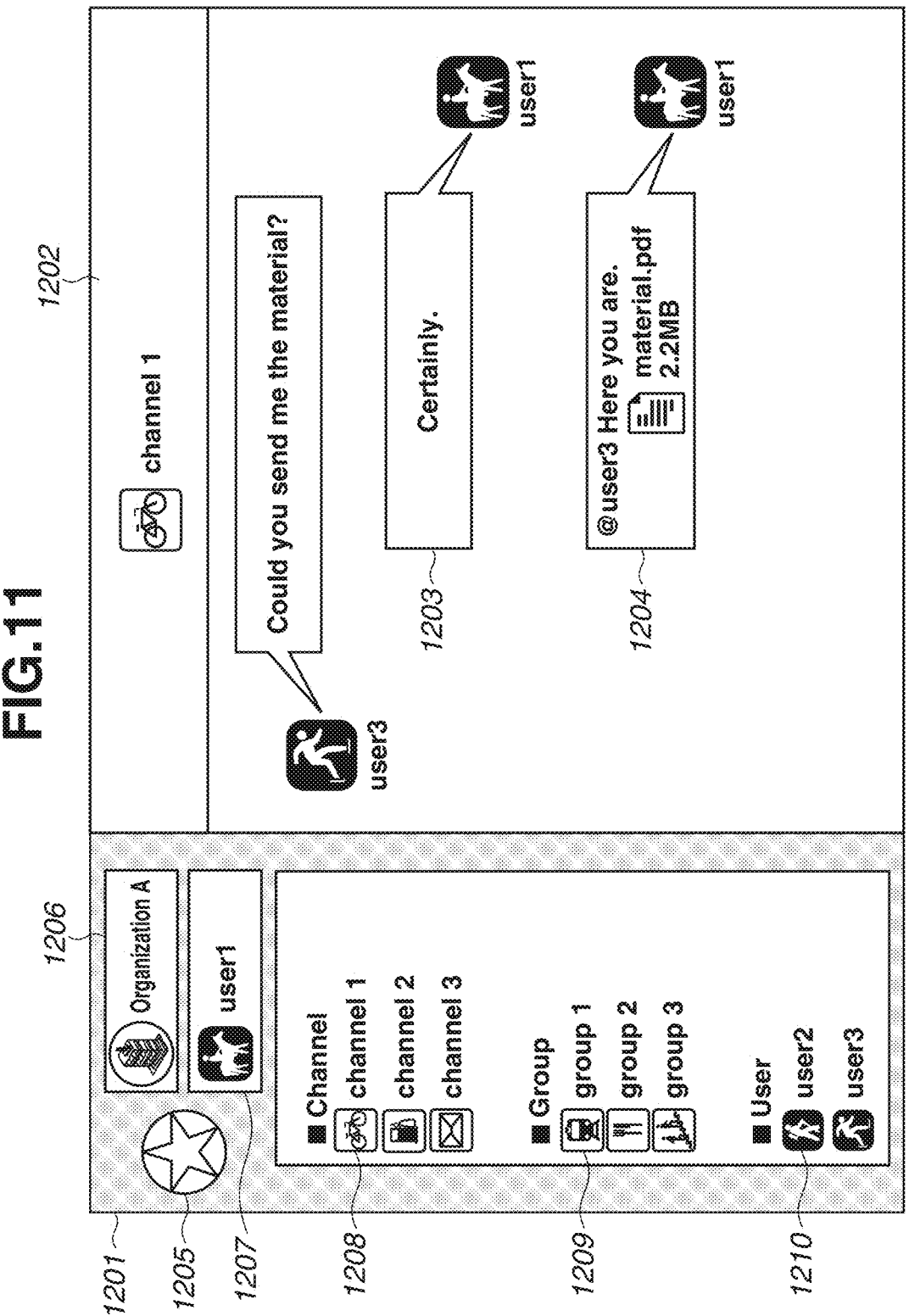
FIG. 11 illustrates an example of a message screen of a message application.

FIG. 11 is a diagram illustrating an example of a message screen of the message application. A message screen 1201 illustrated in FIG. 11 is displayed when the message application is activated on the mobile terminal 200 and the MFP 101 performs the processing of step S1019. The mobile terminal 200 is communicating with the message application server 300.

If the user activates the message application on the mobile terminal 200 and inputs the identifier (ID) and password of the user's account to log in, a screen dedicated to the user is displayed.

A message 1204 is a message displayed (posted) by the user having the account of user1 transmitting image data generated by scanning and post parameters to the message application server 300 using the MFP 101. In the example of FIG. 11, "channel 1" is specified as the post destination channel and "user3" belonging to channel 1 is specified as the mention user in the post parameters. In the example, the post parameters also include "material.pdf" specified as the filename and "Here you are." specified as the comment. The filename and the comment are specified on a not-illustrated scan to chat detailed setting screen by the user.

The message screen 1201 displays the names and icons of channels 1208 and groups 1209 in which the login user participates, and the names and icons of other users 1210 participating in the channels 1208 and the groups 1209. The message screen 1201 also displays an icon 1205 of the logged-in message application. As for the logged-in workspace (organization), a workspace name and icon 1206 are displayed. The message screen 1201 further displays post destination information 1202 and exchanged messages 1203. Posting the message 1204 with a comment including a username preceded by "@" indicates that the posted user is the specific user whom the login user wants to notify of the message in particular in the channel.

In the case of FIG. 11, the message application notifies the mobile terminal of user3 of the reception of the post. This makes user3 likely to notice the post made by user1. If the mobile terminal 200 user3 uses for browsing is a smartphone, the mobile terminal 200 issues a user notification by using an icon notification function, vibrations, and/or a ringtone. If the mobile terminal 200 user3 uses for browsing is a desktop terminal, the mobile terminal 200 issues the user notification by using a desktop notification function. In displaying the screen, the message application server 300 searches a data structure illustrated in FIG. 10 for information to be used, and displays the information. For example, posting the message 1204 corresponds to "utterance 3+file 1" in interaction contents 505. The message application server 300 obtains attribute information, such as the name of file 1, from files 504, and displays the attribute information in the form of a file icon on the message 1204. If the user selects the file icon, file 1 belonging to the files 504 can be obtained. While the file posted to this channel is displayed here as an icon, a preview image of the file may be displayed.

Figure 10:
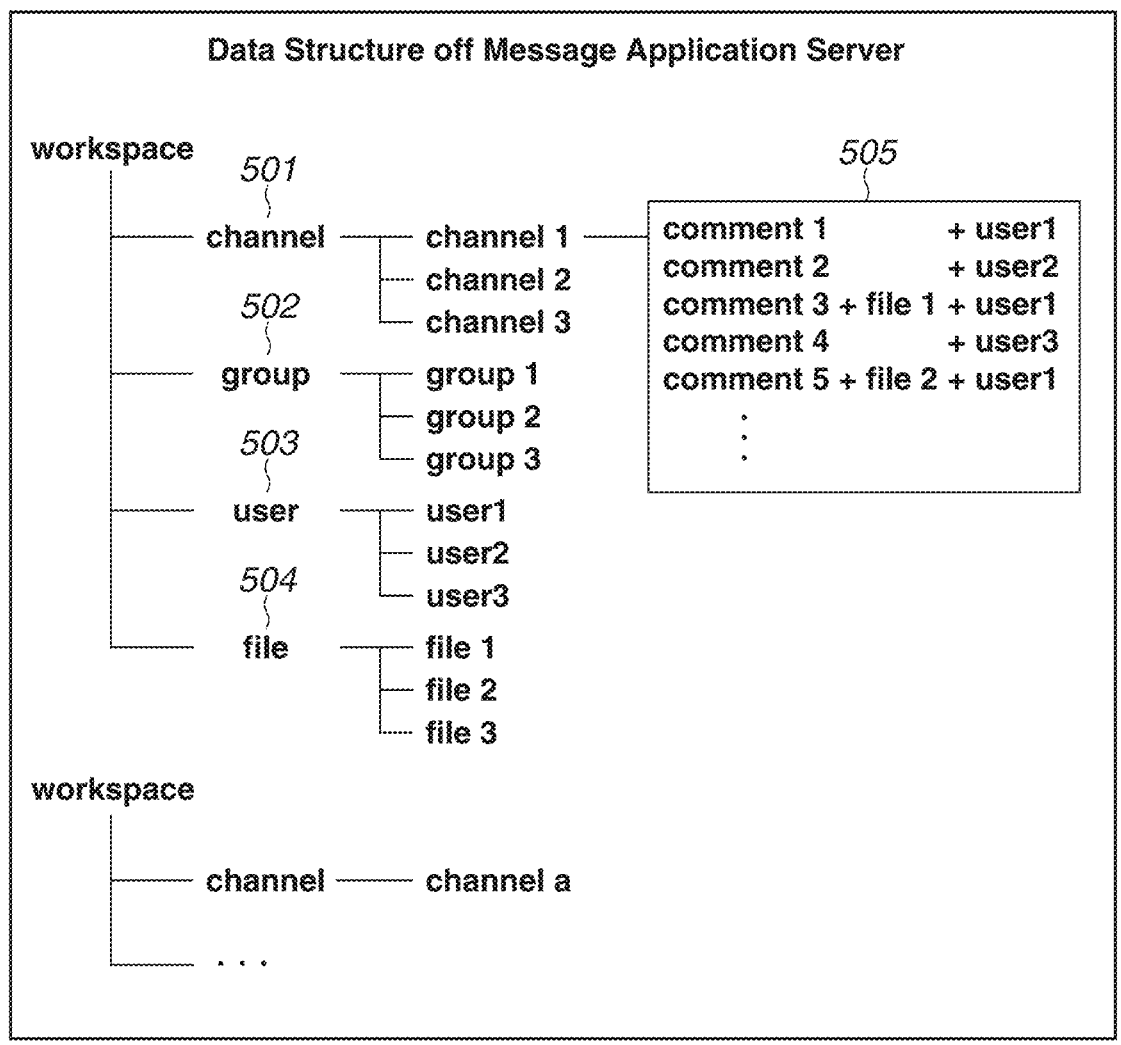
FIG. 10 illustrates an example of a data structure in the message application server.

FIG. 10 is a diagram illustrating an example of the data structure in the message application server 300. The data structure is stored in the HDD 305 of the message application server 300. The screen of FIG. 11 is displayed based on the data structure. The message application server 300 manages data with largest units workspace and with smaller units such as channels, groups, users, and files therein. Channels 501 are chatrooms of a type where all the members of the workspace can participate and all posted contents can be searched by any of the members. Groups 502 are channels for discussions not open to all the members. Invitations are needed to browse and participate in the groups 502. Users 503 refer to users participating in the workspace. Files 504 store attached files. The interaction contents 505 of the respective channels, groups, and users are stored in association with each other. For example, users participating in channel 1 are associated with and stored in channel 1. Messages and image data exchanged in channel 1 are also associated with and stored in channel 1. This enables display of users corresponding to specified channel information when a channel is selected on the channel selection screen 713. The users participating in the channel can thereby be displayed.

FIG. 17 is a diagram illustrating an example of the button setting registration screen 1701. The button setting registration screen 1701 is a screen displayed on the operation unit 116 of the MFP 101. The button setting registration screen 1701 may be displayed as a web page on the operation unit of an information processing apparatus, such as a PC, connected to the MFP 101 via a network.

The button setting registration screen 1701 of FIG. 17 displays a service 1712, a connection destination input field 1710, and a token information input field 1711. The connection destination input field 1710 and the token information input field 1711 are capable of input and modification using a keyboard. If a connection destination and token information are input, the CPU 111 checks whether the connection destination is a supportable application service. If the application service of the connection destination has an application programming interface (API) for providing service information, the CPU 111 makes an inquiry to the application service. If the application service does not have an API for providing service information, the CPU 111 determines whether the application service is supportable based on the domain name of Universal Resource Locator (URL) information registered by using a new registration button 1507 illustrated in FIG. 12.

Next, the CPU 111 obtains channel list information and icon images from the message application server 300. The channel list information includes information about channels and users included in the workspace corresponding to the token information input to the token information input field 1711. The icon images are identification information about the channels. Here, the CPU 111 also obtains icon images of the users belonging to the channels, and an icon image of the workspace corresponding to the token information input to the token information input field 1711. With the acquisition of the channel list information and the icon images completed, a channel selection field 1720 of the button setting registration screen 1701 becomes capable of channel selection. The user selects a channel to post scanned image data to from a list of channels.

In such a manner, the group (workspace or channel) that is the transmission destination of the image data can be set in association with the scan to scan button, on the button setting registration screen 1701.

If the channel set in the channel selection field 1720 is detected to be changed, the CPU 111 obtains a list (mention user list) of mention users who are users belonging to the channel set in the channel selection field 1720 and can be specified to be mentioned, from the channel list information.

With the mention user list obtained from the channel list information, the mention user selection field 1721 becomes capable of selection of a user to be mentioned. The user selects a user to be mentioned from the mention user list displayed in the mention user selection field 1721. The setting of the mention user selection field 1721 can be skipped. If the setting is skipped, the scan to chat processing may be performed based on the screen flow of "each-time mention" illustrated in FIGS. 14 and 15. Alternatively, an option representing each-time mention may be displayed in the mention user selection field 1721. When the option representing each-time mention is selected, the scan to chat processing may be performed based on the screen flow of each-time mention.

If a mention user is set in the mention user selection field 1721, the scan to chat processing may be performed based on the screen flow of "fixed mention" illustrated in FIGS. 14 and 15. If "no mention" is set in the mention user selection field 1721, the scan to chat processing may be performed based on the screen flow of "no mention" illustrated in FIGS. 14 and 15. The screen flow of "no mention" refers to, for example, the procedure where the fixed phrase selection screen 715 is displayed after the selection of the scan to chat button 711 in the screen flow illustrated in FIGS. 14 and 15.

A plurality of channels can also be selected in the channel selection field 1720. In such a case, a plurality of pieces of channel information is transmitted to the message application server 300 so that image data is posted to the plurality of channels. Moreover, if a plurality of channels is selected, a mention user can be selected for each of the selected channels. Even if the number of selected channels is one, a plurality of users belonging to the channel can be selected in the mention user selection field 1721.

An icon image display field 1730 displays an icon image based on the settings. For example, if a single channel is set and a plurality of mention users is set, or if a single channel is set and no mention user is set, the icon image of the channel set in the channel selection field 1720 is automatically displayed. In other words, the icon image of the channel is selected without accepting the user's operation. If a plurality of channels is set, the icon of the workspace corresponding to the token information input to the token information input field 1711 is displayed.

If the workspace is unable to be identified, the icon image of the service 1712 is displayed. The icon image displayed in the icon image display field 1730 is displayed as the icon image of the scan to chat button when the scan to chat button is registered in the home screen 608.

If no icon image is registered for the channel, a predetermined image may be displayed. The icon image to be displayed can be changed within a selectable range. For example, the icon image of the service 1712 may be displayed even in a state where the icon image of the user selected in the mention user selection field 1721 is registered.

In such a manner, the icon image of the scan to chat button can be set in the button setting registration screen 1701 by obtaining the icon images of the workspace and the channels that are group identification information about the workspace and the channels from the message application server 300. Similarly, the icon image of a mention user who is the notification destination user can be obtained from the message application server 300 and used as the icon image of the scan to chat button.

A character string to be displayed as the name of the scan to chat button in adding the scan to button to the home screen 608 is input into a button name setting field 1731. The name corresponding to the icon image selected as that of the scan to chat button by the user is automatically set as the character string. For example, in FIG. 17, the icon image of channel 1 is registered as the icon image and displayed in the icon image display field 1730, and thus the channel name "channel 1" corresponding to the icon image is input into the button name setting field 1731. If the icon image corresponding to a user is selected as the icon image, the username of the user (e.g., "user1") is input. The names of the channel and the user input here are information included in the channel list information obtained from the message application server 300. In such a manner, the name of the scan to chat button can be set on the button setting registration screen 1701 by obtaining the workspace name and the channel names that are group identification information about the workspace and the channels from the message application server 300. The username of the mention user who is the notification destination user can similarly be obtained from the message application server 300 and used as the button name.

The name of the channel selected in the channel selection field 1720 may be automatically set as the character string to be displayed as the button name without accepting the user's operation.

The input character string can be freely modified by the user afterward. The character string can be deleted, added, and changed by using the keyboard. "Channel 1" is displayed on the scan to chat button as the button name set here similar to the scan to chat button 602 displayed on the home screen 608 illustrated in FIG. 13.

A fixed phrase mode selection field 1732 is capable of selecting the settings of comments to be transmitted with scanned image data. The fixed phrase mode selection field 1732 displays, for example, an option "select mode" for enabling selection of fixed phrases preset in fixed phrase setting fields 1733 in performing the scan to chat processing. Other options to be displayed include "fixed mode" where a fixed phrase set in a fixed phrase setting field 1733 in advance is transmitted in a fixed manner, and "no comment mode" where the image data is transmitted without a comment.

The button setting registration screen 1701 is also capable of making scan settings. A two-sided setting field 1740 is capable of selecting whether to scan both sides or one side of a document. The user can select the two-sided setting field 1740 and select "one-sided" or "two-sided" from the pull-down list.

A color setting field 1741 is capable of selecting whether to scan a document in color or monochrome. The user can select the color setting field 1741 and select "color" or "monochrome" from the pull-down list.

The user fixes the settings by pressing a set button 1750 after the settings are made on the button setting registration screen 1701. The setting values set here are stored in the storage 114. In a second exemplary embodiment described below, the setting values are stored in the HDD 405.

If a generation button 1506 of a setting registration screen 1501 (see FIG. 12) is pressed, a button for performing the scan to chat processing based on the settings registered in the button setting registration screen 1701 is additionally displayed on the home screen 608.

FIG. 18 illustrates a correspondence table including categories for the message application server 300 to handle, names, icon images, and sources for the MFP 101 to obtain the icon images from.

The icon image of Service A is managed by Service A that is a message service provided by the message application server 300. The MFP 101 can obtain the icon image from the message application server 300. The icon image of Service B is recorded within the MFP 101.

The icon images of Organizations A and B are included in management information about Service A. In other words, the MFP 101 obtains the icon images of Organizations A and B from the message application server 300 by transmitting the token information corresponding to the workspaces managed by the message application server 300 to the message application server 300.

The icon images of the channels, groups, and users are information included in the channel list information about Organization A. The MFP 101 obtains the icon images from the message application server 300.

Figure 19:
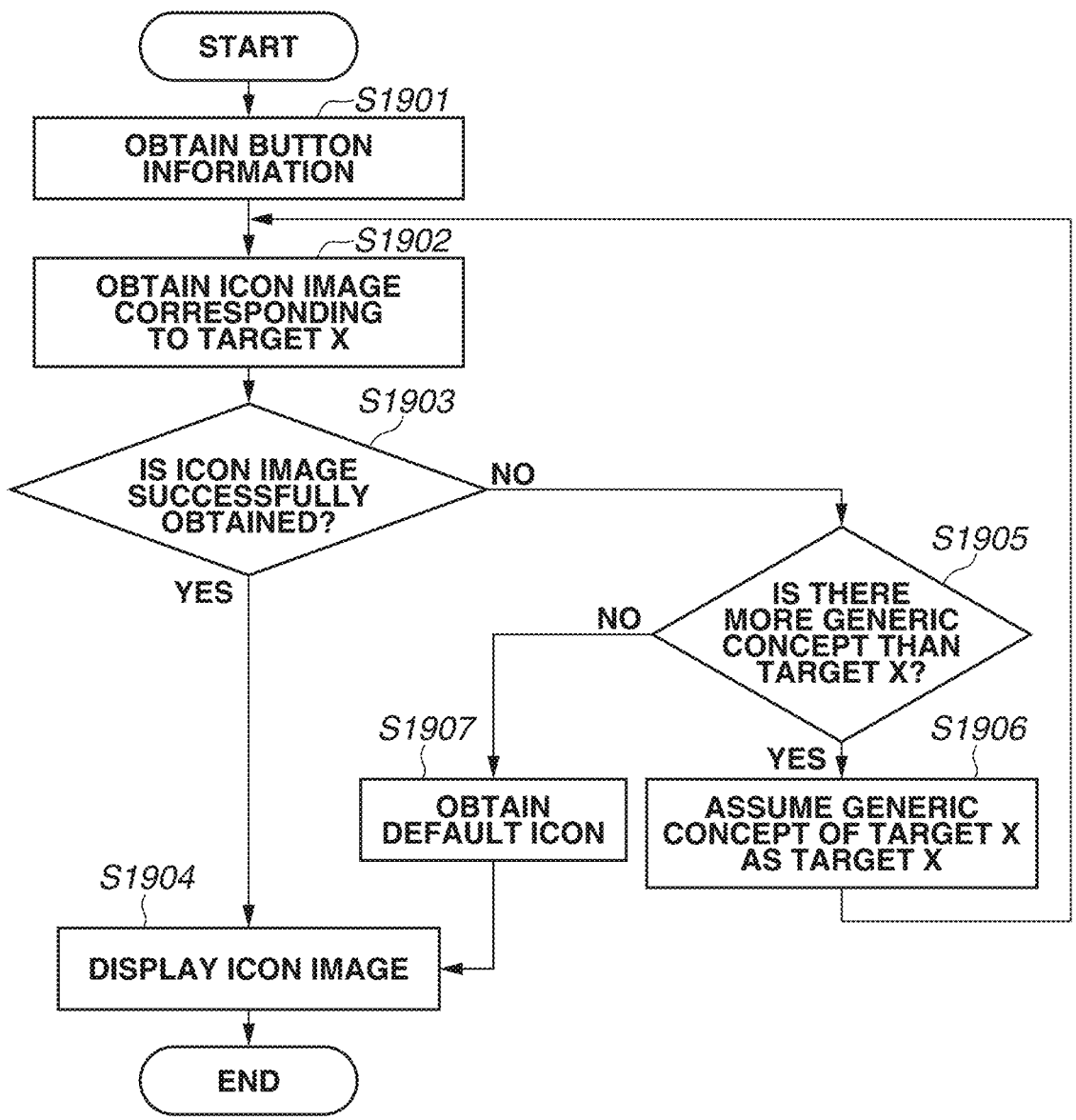
FIG. 19 is a flowchart illustrating processing in obtaining an icon.

FIG. 19 is a flowchart illustrating an example of processing where the CPU 111 of the MFP 101 obtains an icon image for displaying the scan to chat button 602 on the home screen 608. The flowchart is executed when the MFP 101 obtains icon information in steps S1007 and S1012 of FIGS. 7, S1307 and S1312 of FIG. 9, FIGS. 17, 14, and FIG. 15, and when the operation unit 116 is activated to display the home screen 608. The procedure of FIG. 19 is implemented by the CPU 111 of the MFP 101 reading the program stored in the ROM 112 into the RAM 113 and executing the program.

In step S1901, the CPU 111 obtains button information registered on the button setting registration screen 1701 illustrated in FIG. 17 from the storage 114.

In step S1902, the CPU 111 obtains an icon image corresponding to a target X from the message application server 300 or the storage 114. As employed herein, the target X refers to information registered in the button information and serves as a destination. Candidate concepts for the target X include, in descending order from the most generic, an application service, a workspace, a channel, and a user. Here, the CPU 111 issues an obtaining request for the icon image corresponding to the target X to the icon image source illustrated in FIG. 18.

In step S1903, the CPU 111 determines whether the icon image is successfully obtained. If the icon image is successfully obtained (YES in step S1903), the processing proceeds to step S1904. If the icon image is not successfully obtained (NO in step S1903), the processing proceeds to step S1905.

In step S1904, the CPU 111 displays the icon image on the operation unit 116.

In step S1905, the CPU 111 checks whether there is a more generic concept than the target X. If there is such a concept (YES in step S1905), the processing proceeds to step S1906. If not (NO in step S1905), the processing proceeds to step S1907.

In step S1906, the CPU 111 assumes the more generic concept present as the target X. The processing proceeds to step S1902.

In step S1907, the CPU 111 obtains a specific default icon from the storage 114. In other words, the processing of step S1907 is performed if none of the application service, the workspace, the channel, and the user has an icon image.

According to the present exemplary embodiment, a group where image data generated by the image processing apparatus performing a scan is shared in response to the selection of a registered object can be more easily identified from the object.

In the first exemplary embodiment, the MFP 101 is described to directly transmit the image data and the post parameters to the message application server 300. A second exemplary embodiment deals with an example where an MFP 101 transmits image data and post parameters to a message application server 300 via a bot server 400.

Figure 8:
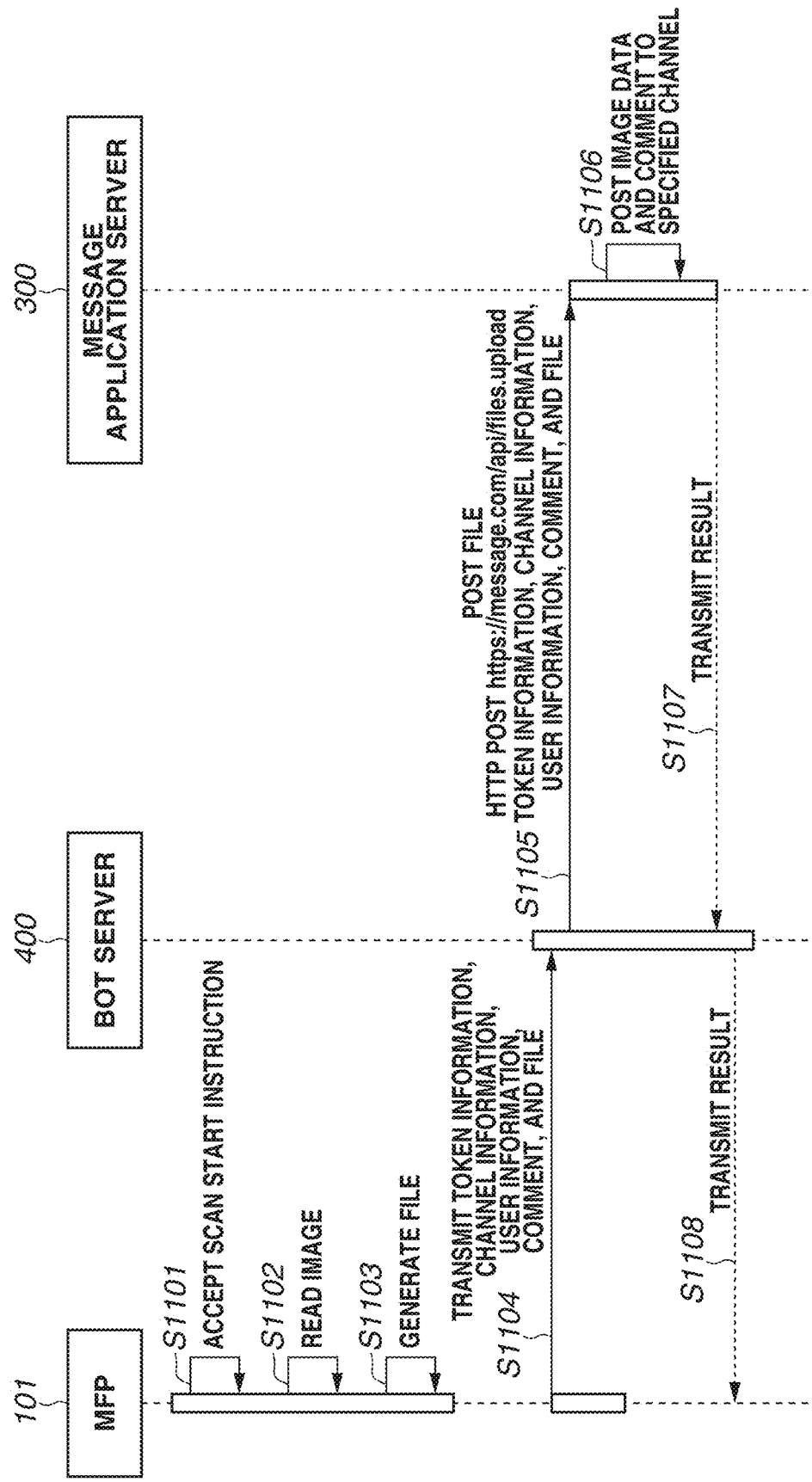
FIG. 8 illustrates an example of a sequence where the MFP transmits a file generated by scanning to the message application server via the bot server.

FIG. 8 is a diagram illustrating an example of a sequence where the MFP 101 transmits a file generated by scanning to the message application server 300 via the bot server 400.

In step S1101, a CPU 111 of the MFP 101 accepts the selection of a scan to chat button 602, which is a scan start instruction. If a screen for accepting the selection of a channel, a mention user, and/or a fixed phrase is displayed in response to the selection of the scan to chat button 602, the scan is started when the selection is accepted.

In step S1102, the CPU 111 controls a reading unit 118 to read an image of a document based on scan settings made on the button setting registration screen 1701 illustrated in FIG. 17. In step S1103, the CPU 111 generates image data (file) based on the read image.

In step S1104, the CPU 111 controls a communication unit 126 to transmit various types of information for posting the image data to the bot server 400. Here, token information registered on the button setting registration screen 1701 illustrated in FIG. 17, channel information set on the button setting registration screen 1701 or the screens illustrated in FIGS. 14 and 15, user information about a user to be mentioned, and a comment are transmitted along with the image data.

In step S1105, a CPU 401 of the bot server 400 transmits the received various types of information to the message application server 300. The information is transmitted by executing a command "HTTP POST https://message.com/api/files.upload".

In step S1106, a CPU 301 of the message application server 300 searches for registered workspace information and application information by using the token information received in step S1105, and stores the specified channel in association with the received image data and channel information. In other words, the CPU 301 performs control to post the received image data and comment to the specified channel. If a mention user is specified, the CPU 301 further stores the received image data, channel, and post destination user in association with each other. Whereby, a screen where the received image data is posted appears when the user activates the message application on the mobile terminal 200 and specifies the channel to check the contents of the conversations in the channel.

In step S1107, the CPU 301 of the message application server 300 transmits a result corresponding to whether the post is successful to the bot server 400 as HTTP communication response information.

In step S1108, the CPU 401 of the bot server 400 transmits the result received in step S1107 to the MFP 101. If the post is successful, the CPU 111 of the MFP 101 may display a notification that the post is successful on the operation unit 116. If the post is failed, the CPU 111 of the MFP 101 may display a notification that the post is failed on the operation unit 116. Alternatively, the CPU 111 may display the notification that the post is failed only when the post is failed, without displaying a notification when the post is successful.

FIG. 16 is a diagram illustrating an example of association between IDs and token information. In the table of FIG. 16, user IDs or device IDs are registered in association with authorization information (token information). This table is stored in an HDD 405 of the bot server 400. Here, the user IDs and the device IDs are information stored in MFPs 101. A user ID is user identification information set for each user who uses an MFP 101. A device ID is device identification information set for each MFP. The user IDs are identification information set by the users in generating a user account for logging in to the MFPs 101. The device IDs are identification information specific to the respective MFPs 101, set upon factory shipment.

The token information illustrated in FIG. 16 is used in performing the scan to chat processing without selecting the scan to chat button 602.

Figure 9:
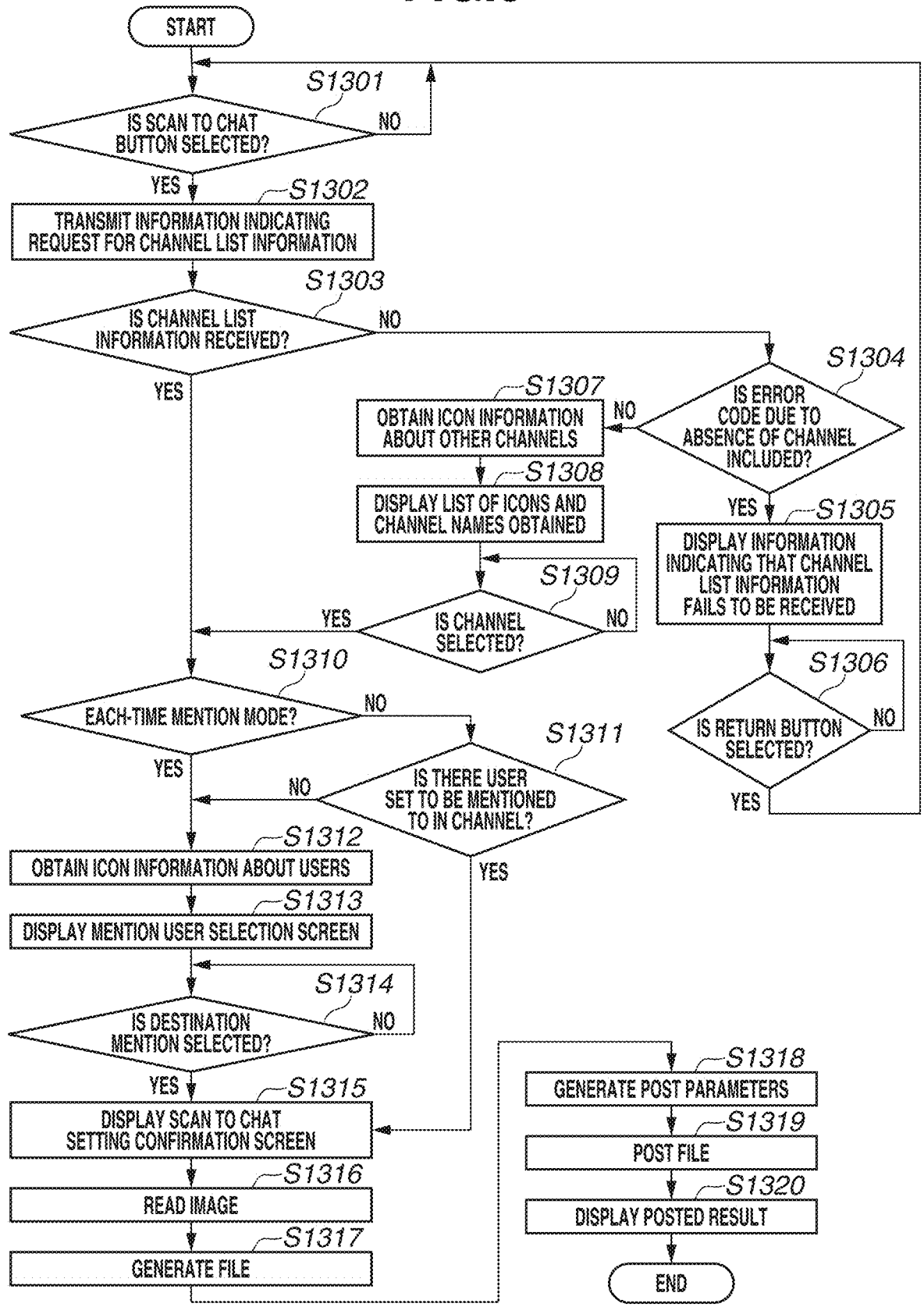
FIG. 9 is a flowchart illustrating an example of the scan to chat processing.

FIG. 9 is a flowchart illustrating an example of processing according to the present exemplary embodiment in a case where the scan to chat button 602 is selected. The operations (steps) of the flowchart according to the present exemplary embodiment are implemented by the CPU 111 reading a control program stored in the ROM 112 or the storage 114 into a RAM 113 and executing the control program. A description of steps where similar processing to that of FIG. 7 is performed in the flowchart illustrated in FIG. 9 will be omitted.

The processing of step S1301 is similar to that of step S1001 in FIG. 7.

In step S1302, the CPU 111 transmits information indicating a request for channel list information to the bot server 400. Here, the CPU 111 transmits token information 1503 registered in advance to the bot server 400. The CPU 401 of the bot server 400 then transmits the received token information and the information indicating the request for the channel list information to the message application server 300.

In step S1303, the CPU 111 determines whether the channel list information is received from the message application server 300 in response to the request for the channel list information, transmitted in step S1302. Specifically, the CPU 111 determines whether the bot server 400 receives the channel list information from the message application server 300 and the MFP 101 receives the channel list information from the bot server 400. If the response of the HTTP communication includes a status code indicating an error or body information in the response includes a parameter indicating that the channel list information is unable to be obtained, the CPU 111 determines that the channel list information is not received.

The processing of steps S1304 to S1306 is similar to that of steps S1004 to S1006 illustrated in FIG. 7.

In step S1307, the CPU 111 transmits a request for icon information about other channels in the target workspace to the bot server 400, and the bot server 400 transmits the request to the message application server 300. The MFP 101 thereby obtains the icon information about the other channels in the target workspace from the message application server 300 via the bot server 400.

The processing of steps S1308 to S1311 is similar to that of steps S1008 to S1011 illustrated in FIG. 7.

In step S1312, the CPU 111 obtains icon information about users belonging to the target channel from the message application server 300 via the bot server 400 in the foregoing manner.

The processing of steps S1313 to S1318 is similar to that of steps S1013 to S1018 illustrated in FIG. 7.

In step S1319, the CPU 111 transmits the token information 1503 registered in advance, the file generated in step S1317, and the post parameters generated in step S1318 to the bot server 400. The bot server 400 transmits the token information 1503, the file generated in step S1317, and the post parameters generated in step S1318 to the message application server 300 by the POST method of HTTP communication. With such data (the file into which the image data is converted and the post parameters) transmitted to the message application server 300, the message application server 300 performs control such that the received file is posted to the user specified by the received mention information in the channel specified by the received channel information.

In step S1320, the CPU 111 receives the posted result from the message application server 300 via the bot server 400, and displays the posted result on a touch panel 601 of the operation unit 116.

In the present exemplary embodiment, only one piece of token information is described to be registered. If a plurality of pieces of token information is registered, the token information-related processing, namely, the processing of steps S1302, S1303, and S1319 is performed as many times as the number of pieces of token information registered.

According to the present exemplary embodiment, easy identification of a group from an object can be implemented by simply updating the program of the bot server 400 without uploading the program of MFP 101, even in a case where the interface specifications of the message application server 300 are changed. Moreover, files can be posted without setting a token for each individual MFP in an office where a plurality of MFPs is installed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A scanning apparatus comprising:
   a scanner that scans a document to generate image data;
   a controller that obtains a plurality of icon images for enabling a user to identify respectively a plurality of groups of a chat service;
   a user interface that displays the obtained plurality of icon images and a plurality of groups respectively corresponding to the obtained plurality of icon images,
   wherein the user interface receives selection, by the user, of a group from the displayed plurality of groups,
   wherein the user interface displays one or more channels included in the selected group, and
   wherein the user interface receives selection, by the user, of a channel from the displayed one or more channels; and
   a communicator that transmits the generated image data,
   wherein the generated image data is stored in association with the selected channel, and
   wherein both a process in which the scanner scans the document to generate the image data and a process in which the communicator transmits the generated image data are performed based on a single execution instruction.

2. The scanning apparatus according to claim 1, wherein the communicator transmits the generated image data and information corresponding to the selected channel to a server, and then the generated image data is stored in association with the selected channel.

3. The scanning apparatus according to claim 1, wherein the controller receives a setting for scanning one side of the document or a setting for scanning both sides of the document,
   wherein the scanner scans, based on the setting for scanning one side of the document or the setting for scanning both sides of the document, the document to generate the image data, and
   wherein the communicator transmits the generated image data and then the generated image data is stored in association with the selected channel.

4. The scanning apparatus according to claim 1, further comprising
   a printer that prints an image on a sheet based on the image data generated by the scanner.

5. The scanning apparatus according to claim 1,
   wherein the controller further obtains information indicating the plurality of groups of the chat service.

6. The scanning apparatus according to claim 1, wherein the controller obtains the plurality of icon images from a server providing the chat service.

7. The scanning apparatus according to claim 1, wherein the communicator transmits the generated image data through HTTP communication.

8. The scanning apparatus according to claim 1,
   wherein the communicator transmits token information to a server, and
   wherein the controller obtains the plurality of icon images for enabling the user to identify respectively the plurality of groups in association with the user corresponding to the token information.

9. The scanning apparatus according to claim 1, wherein the generated image data is stored in association with the selected channel by transmission of the generated image data by the communicator.

10. A scanning apparatus comprising:
    a scanner that scans a document to generate image data;
    a controller that obtains a plurality of icon images for enabling a user to identify respectively a plurality of groups of a chat service;
    a user interface that displays the obtained plurality of icon images and a plurality of groups respectively corresponding to the obtained plurality of icon images,
    wherein the user interface receives selection, by the user, of a group from the displayed plurality of groups,
    wherein the user interface displays one or more channels included in the selected group, and
    wherein the user interface receives selection, by the user, of a channel from the displayed one or more channels; and
    a communicator that transmits the generated image data.

11. The scanning apparatus according to claim 10,
    wherein the communicator transmits the generated image data and information corresponding to the selected channel to a server, and then
    the generated image data is stored in association with the selected channel.

12. The scanning apparatus according to claim 10, wherein the controller receives a setting for scanning one side of the document or a setting for scanning both sides of the document,
    wherein the scanner scans, based on the setting for scanning one side of the document or the setting for scanning both sides of the document, the document to generate the image data, and wherein the communicator transmits the generated image data and then the generated image data is stored in association with the selected channel.

13. The scanning apparatus according to claim 10, further comprising
a printer that prints an image on a sheet based on the image data generated by the scanner.

14. The scanning apparatus according to claim 10,
wherein the controller further obtains information indicating the plurality of groups of the chat service.

15. The scanning apparatus according to claim 10, wherein the controller obtains the plurality of icon images from a server providing the chat service.

16. The scanning apparatus according to claim 10, wherein the communicator transmits the generated image data through HTTP communication.

17. The scanning apparatus according to claim 10,
wherein the communicator transmits token information to a server, and
wherein the controller obtains the plurality of icon images for enabling the user to identify respectively the plurality of groups in association with the user corresponding to the token information.

18. The scanning apparatus according to claim 10, wherein the generated image data is stored in association with the selected channel by transmission of the generated image data by the communicator.

19. A non-transitory computer-readable storage medium storing a program that causes a scanning apparatus to execute a method, the method comprising:
scanning a document to generate image data;
obtaining a plurality of icon images for enabling a user to identify respectively a plurality of groups of a chat service;
displaying the obtained plurality of icon images and a plurality of groups respectively corresponding to the obtained plurality of icon images;
receiving selection, by the user, of a group from the displayed plurality of groups,
displaying one or more channels included in the selected group; receiving selection, by the user, of a channel from the displayed one or more channels; and
transmitting the generated image data,
wherein the generated image data is stored in association with the selected channel, and
wherein, both a process in which the document is scanned to generate the image data and a process in which the generated image data is transmitted are performed based on a single execution instruction.

20. The non-transitory computer-readable storage medium according to claim 19,
wherein the generated image data and information corresponding to the selected channel are transmitted to a server, and then
the generated image data is stored in association with the selected channel.

21. The non-transitory computer-readable storage medium according to claim 19, the method further comprising:
receiving a setting for scanning one side of the document or a setting for scanning both sides of the document,
wherein the document is scanned, based on the setting for scanning one side of the document or the setting for scanning both sides of the document, to generate the image data, and wherein the generated image data is transmitted and then the generated image data is stored in association with the selected channel.

22. The non-transitory computer-readable storage medium according to claim 19, the method further comprising:
printing an image on a sheet based on the image data generated by the scanner.

23. The non-transitory computer-readable storage medium according to claim 19, the method further comprising:
obtaining information indicating the plurality of groups of the chat service.

24. The non-transitory computer-readable storage medium according to claim 19, wherein the plurality of icon images is obtained from a server providing the chat service.

25. The non-transitory computer-readable storage medium according to claim 19, wherein the generated image data is transmitted through HTTP communication.

26. The non-transitory computer-readable storage medium according to claim 19, the method further comprising:
transmitting token information to a server,
wherein the obtained plurality of icon images is a plurality of icon images for enabling the user to identify respectively the plurality of groups in association with the user corresponding to the token information.

27. The non-transitory computer-readable storage medium according to claim 19, wherein the generated image data is stored in association with the selected channel by transmission of the generated image data by the transmitting.

28. A non-transitory computer-readable storage medium storing a program that causes a scanning apparatus to execute a method, the method comprising:
scanning a document to generate image data;
obtaining a plurality of icon images for enabling a user to identify respectively a plurality of groups of a chat service;
displaying the obtained plurality of icon images and a plurality of groups respectively corresponding to the obtained plurality of icon images;
receiving selection, by the user, of a group from the displayed plurality of groups,
displaying one or more channels included in the selected group;
receiving selection, by the user, of a channel from the displayed one or more channels; and
transmitting the generated image data.

29. The non-transitory computer-readable storage medium according to claim 28,
wherein the generated image data and information corresponding to the selected channel are transmitted to a server, and then
the generated image data is stored in association with the selected channel.

30. The non-transitory computer-readable storage medium according to claim 28, the method further comprising:
receiving a setting for scanning one side of the document or a setting for scanning both sides of the document,
wherein the document is scanned, based on the setting for scanning one side of the document or the setting for scanning both sides of the document, to generate the image data, and wherein the generated image data is transmitted and then the generated image data is stored in association with the selected channel.

31. The non-transitory computer-readable storage medium according to claim 28, the method further comprising:
   printing an image on a sheet based on image data generated by the scanner.

32. The non-transitory computer-readable storage medium according to claim 28, the method further comprising:
   obtaining information indicating the plurality of groups of the chat service.

33. The non-transitory computer-readable storage medium according to claim 28, wherein the plurality of icon images is obtained from a server providing the chat service.

34. The non-transitory computer-readable storage medium according to claim 28, wherein the generated image data is transmitted through HTTP communication.

35. The non-transitory computer-readable storage medium according to claim 28, the method further comprising:
   transmitting token information to a server,
   wherein the obtained plurality of icon images is a plurality of icon images for enabling the user to identify respectively the plurality of groups in association with the user corresponding to the token information.

36. The non-transitory computer-readable storage medium according to claim 28, wherein the generated image data is stored in association with the selected channel by transmission of the generated image data by the transmitting.

* * * * *